US012776852B2

(12) United States Patent
Yoshioka et al.

(10) Patent No.: US 12,776,852 B2
(45) Date of Patent: Oct. 27, 2026

(54) TERMINAL AND COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 361 days.

(21) Appl. No.: 17/755,259

(22) PCT Filed: Nov. 1, 2019

(86) PCT No.: PCT/JP2019/043150
§ 371 (c)(1),
(2) Date: Apr. 25, 2022

(87) PCT Pub. No.: WO2021/084758
PCT Pub. Date: May 6, 2021

(65) Prior Publication Data
US 2022/0376816 A1 Nov. 24, 2022

(51) Int. Cl.
*H04L 1/08* (2006.01)
*H04L 1/00* (2006.01)
*H04L 1/1812* (2023.01)

(52) U.S. Cl.
CPC .............. *H04L 1/0004* (2013.01); *H04L 1/08* (2013.01); *H04L 1/1812* (2013.01)

(58) Field of Classification Search
None
See application file for complete search history.

(56) References Cited

U.S. PATENT DOCUMENTS 10,079,654 B2 * 9/2018 Xia ........................ H04L 1/0026
10,103,838 B2 * 10/2018 Yang ...................... H04L 1/0026
10,154,515 B1 * 12/2018 Oroskar ................ H04L 1/0003
10,291,378 B1 * 5/2019 Bai ........................ H04L 1/0025
(Continued)

FOREIGN PATENT DOCUMENTS

JP 2016-514921 A 5/2016
JP 2019-134354 A 8/2019
(Continued)

OTHER PUBLICATIONS

Office Action issued in the counterpart Japanese Application No. 2021-554042, mailed Feb. 13, 2024 (5 pages).
(Continued)

*Primary Examiner* — Gregory B Sefcheck
(74) *Attorney, Agent, or Firm* — Osha Bergman Watanabe & Burton LLP

(57) ABSTRACT

A terminal includes a receiver configured to receive, from another terminal, first control information in communication between terminals. The terminal further includes a processor configured to calculate a size of a transport block to be received from the other terminal, based on a modulation and coding scheme (MCS) index that is included in the first control information, the MCS index being other than an MCS index whose corresponding target code rate in a table is reserved, the table being a table in which MCS indexes, modulation orders, and target code rates are associated with each other. In other aspects, a communication method executed by a terminal is also disclosed.

3 Claims, 13 Drawing Sheets

(56) References Cited

U.S. PATENT DOCUMENTS

| | | | | |
|---|---|---|---|---|
| 11,018,921 | B2 * | 5/2021 | Chen Larsson | H04L 1/0016 |
| 11,184,903 | B1 * | 11/2021 | Lin | H04L 1/0009 |
| 12,015,478 | B2 * | 6/2024 | Nimbalker | H04L 1/0002 |
| 2014/0169297 | A1 * | 6/2014 | Kim | H04L 5/0053 370/329 |
| 2014/0313985 | A1 * | 10/2014 | Nimbalker | H04L 27/0008 370/329 |
| 2015/0117568 | A1 * | 4/2015 | Wang | H04L 5/1453 375/295 |
| 2015/0195818 | A1 * | 7/2015 | Davydov | H04W 72/23 370/329 |
| 2015/0195819 | A1 * | 7/2015 | Kwon | H04L 1/0026 370/329 |
| 2015/0200746 | A1 * | 7/2015 | Pan | H04L 1/00 370/329 |
| 2015/0296503 | A1 * | 10/2015 | Larsson | H04L 1/0003 370/329 |
| 2016/0087752 | A1 * | 3/2016 | Xia | H04L 5/0057 370/329 |
| 2016/0205564 | A1 * | 7/2016 | Ren | H04L 1/0009 370/252 |
| 2016/0226623 | A1 * | 8/2016 | Fröberg Olsson | H04B 7/0626 |
| 2017/0111202 | A1 * | 4/2017 | Kim | H04W 48/20 |
| 2018/0034596 | A1 * | 2/2018 | Noh | H04L 1/0025 |
| 2018/0098235 | A1 * | 4/2018 | Bagheri | H04W 72/044 |
| 2018/0123732 | A1 * | 5/2018 | Axmon | H04L 1/1812 |
| 2018/0242280 | A1 * | 8/2018 | Axmon | H04L 1/203 |
| 2018/0323902 | A1 * | 11/2018 | Rico Alvarino | H04L 1/0031 |
| 2018/0332597 | A1 * | 11/2018 | Li | H04L 1/0016 |
| 2019/0075492 | A1 * | 3/2019 | Suzuki | H04L 1/001 |
| 2019/0222360 | A1 * | 7/2019 | Nam | H04W 28/06 |
| 2019/0356451 | A1 * | 11/2019 | Zhang | H04L 5/0032 |
| 2020/0059316 | A1 * | 2/2020 | Einhaus | H04W 72/231 |
| 2020/0077381 | A1 * | 3/2020 | Wallén | H04L 1/0009 |
| 2020/0204289 | A1 | 6/2020 | Yoshimoto et al. | |
| 2021/0160000 | A1 * | 5/2021 | Fan | H04L 1/0017 |
| 2021/0211242 | A1 * | 7/2021 | Andgart | H04L 1/1864 |
| 2021/0273759 | A1 * | 9/2021 | Maki | H04L 1/0003 |

FOREIGN PATENT DOCUMENTS

| | | | |
|---|---|---|---|
| KR | 10-2019-0100933 | A | 8/2019 |
| WO | 2018/230694 | A1 | 12/2018 |
| WO | 2019/099087 | A1 | 5/2019 |

OTHER PUBLICATIONS

3GPP TS 38.214 V15.7.0, Release 15; "3rd Generation Partnership Project; Technical Specification Group Radio Access Network; NR; Physical layer procedures for data" Sep. 2019 (11 pages).

Office Action issued in Japanese Patent Application No. 2021-554042, mailed on Oct. 3, 2023 (5 pages).

Extended European Search Report issued in counterpart European Patent Application No. 19950891.2, mailed on Jun. 9, 2023 (9 pages).

Samsung; "Discussion on UE behavior when receiving inconsistent SCI"; 3GPP TSG RAN WG1 Meeting #88bis, R1-1705261; Spokane, USA; Mar. 3-7, 2017 (2 pages).

ETSI TS 136 213 V14.30; LTE; Evolved Universal Terrestrial Radio Access (E-UTRA); Physical layer procedures (3GPP TS 36.213 version 14.3.0 Release 14); Aug. 2017; (462 pages).

3GPP TS 36.211 V15.7.0; "3rd Generation Partnership Project; Technical Specification Group Radio Access Network; Evolved Universal Terrestrial Radio Access (E-UTRA); Physical channels and modulation (Release 15)"; Sep. 2019 (239 pages).

3GPP TR 22.886 V15.1.0; "3rd Generation Partnership Project; Technical Specification Group Services and System Aspects; Study on enhancement of 3GPP Support for 5G V2X Services (Release 15)"; Mar. 2017 (58 pages).

International Search Report for corresponding International Application No. PCT/JP2019/043150, mailed Jul. 7, 2020 (5 pages).

Written Opinion for corresponding International Application No. PCT/JP2019/043150, mailed Jul. 7, 2020 (3 pages).

Intel Corporation; "Sidelink physical structure for NR V2X communication"; 3GPP TSG RAN WG1 Meeting #98bis, R1-1910648; Chongqing, China; Oct. 14-20, 2019 (29 pages).

* cited by examiner

TERMINAL AND COMMUNICATION METHOD

TECHNICAL FIELD

The present invention relates to a terminal and a communication method in a radio communication system.

BACKGROUND ART

In LTE (Long Term Evolution) and succeeding systems of LTE (e.g., LTE-A (LTE-Advanced), NR(New Radio) (also referred to as 5G)), D2D (Device to Device) technology for executing direct communication between terminals without an intervening base station has been discussed (see, for example, Non-patent document 1).

D2D reduces traffic between terminals and base stations, and enables communication between terminals when base stations become incapable of executing communication in the event of a disaster or the like. Note that although D2D is referred to as "sidelink" in the 3GPP (3rd Generation Partnership Project), a more general term D2D is used in the present description. However, "sidelink" may also be used as necessary in the description of embodiments, which will be described later.

D2D communication is generally classified into D2D discovery to find another terminal that is ready to communicate, and D2D communication for direct communication between terminals (also referred to as D2D direct communication, D2D communication, direct communication between terminals, etc.). In the following, when D2D communication, D2D discovery, and the like are not distinguished in particular, these may be simply referred to as D2D. Also, a signal transmitted and received in D2D will be referred to as a D2D signal. Various use cases of services related to V2X (Vehicle to Everything) in NR have been discussed (e.g., Non-Patent Document 2).

RELATED ART DOCUMENTS

Non-Patent Documents

NON-PATENT DOCUMENT 1: 3GPP TS 36.211 V 15.7.0 (2019-09)

NON-PATENT DOCUMENT 2: 3GPP TR 22.886 V15.1.0 (2017-03)

SUMMARY OF THE INVENTION

Problem to be Solved by the Invention

In direct communication between terminals in NR-V2X, a table that designates an MCS (Modulation and coding scheme) is used for generating control information. However, in the table, operations of a terminal have not been specified in the case where an index with which the target encoding rate is reserved is designated.

The present invention has been made in view of the above points, and it is an object to determine operations of a terminal based on reserved information in direct communication between terminals.

Means for Solving the Problem

According to the disclosed technique, a terminal is provided that includes a transmission unit configured to transmit control information including an index indicating an MCS (Modulation and Coding Scheme) to another terminal; and a control unit configured to include the index that is reserved, in the control information, in a case of indicating, to said another terminal, information defined in advance.

Effect of the Present Invention

According to the disclosed technique, it is possible to determine operations of a terminal based on reserved information in direct communication between terminals.

EMBODIMENTS FOR CARRYING OUT THE INVENTION

In the following, embodiments of the present invention will be described with reference to the drawings. Note that an embodiment described below merely presents an example, and an embodiment to which the present invention is applied is not limited to the following embodiments.

When operating a radio communication system of an embodiment of the present invention, existing technologies may be used appropriately. Here, the existing technology may be, for example, an existing LTE, but is not limited to the existing LTE. Also, the term "LTE" used in the present description, unless otherwise stated, has a broad meaning that includes methods of LTE-Advanced, those subsequent to LTE-Advanced (e.g., NR), and wireless LANs (Local Area Network).

In an embodiment of the present invention, the duplex method may be a TDD (Time Division Duplex) method, an FDD (Frequency Division Duplex) method, or any other method (e.g., Flexible Duplex, etc.).

Also, in an embodiment of the present invention, stating that a radio parameter or the like is set (configured) may mean that a predetermined value is set in advance (pre-configured), or that a radio parameter indicated by a base station 10 or a terminal 20 is set.

Figure 1:
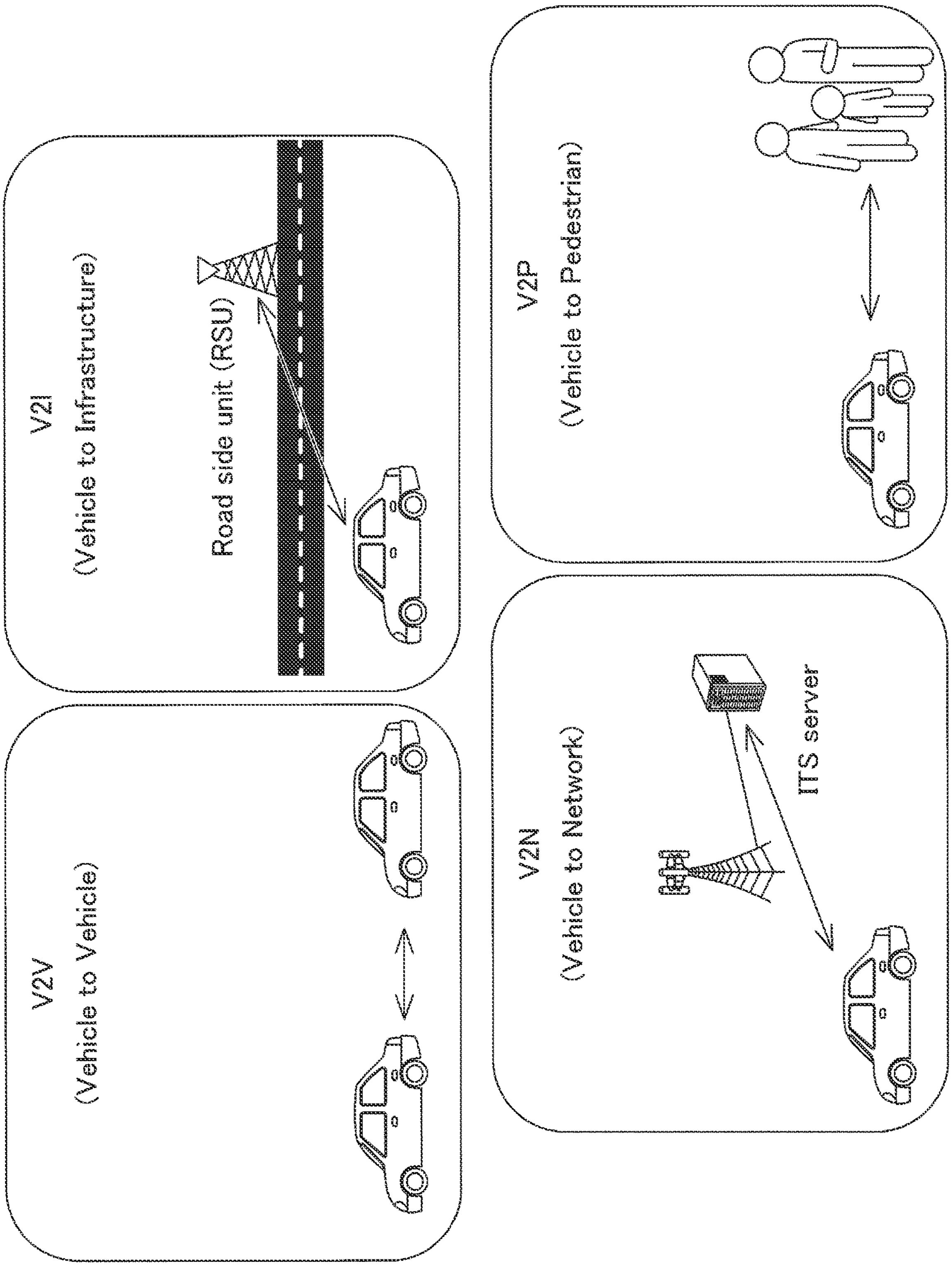
FIG. 1 is a diagram for describing V2X.

FIG. 1 is a diagram for describing V2X. In the 3GPP, implementation of V2X (Vehicle to Everything) or eV2X (enhanced V2X) has been discussed by extending the D2D functions, to establish the specification. As illustrated in FIG. 1, V2X is a part of ITS (Intelligent Transport Systems), which is a generic term of V2V (Vehicle to Vehicle) meaning a form of communication executed between vehicles; V2I (Vehicle to Infrastructure) meaning a form of communication executed between a vehicle and a roadside unit (RSU); V2N (Vehicle to Network) meaning a form of communication executed between a vehicle and an ITS server; and V2P (Vehicle to Pedestrian) meaning a form of communication executed between a vehicle and a mobile terminal held by a pedestrian.

Also, in the 3GPP, V2X that uses cellular communication and communication between terminals of LTE or NR has been discussed. V2X using cellular communication is also referred to as cellular V2X. In V2X of NR, studies are underway to implement high capacity, low latency, high reliability, and QoS (quality of service) control.

In the future, V2X of LTE or NR may be discussed in a way not limited by the discussion of the 3GPP specifications. For example, studies may take place in ensuring interoperability; lowering the cost by implementing an upper layer; combining or switching multiple RAT (Radio Access Technologies); consideration for regulations in respective countries; obtaining and delivering data on V2X platforms of LTE or NR; database management; and use methods.

In an embodiment of the present invention, although a form of a communication device installed on a vehicle is mainly assumed, the embodiment of the present invention is not limited to such a form. For example, the communication device may be a terminal held by a person; the communication device may be a device installed on a drone or an airplane; or the communication device may be a base station, an RSU, a relay node, or a terminal having scheduling capability.

Note that SL (sidelink) may be differentiated based on either UL (uplink) or DL (downlink), and one of or a combination of the following 1) to 4). Also, SL may be replaced with another term.

1) Resource arrangement in the time domain
2) Resource arrangement in the frequency domain
3) Reference synchronization signal (including SLSS (Sidelink Synchronization Signal)
4) Reference signal used for path loss measurement for controlling transmission power Also, for OFDM (Orthogonal Frequency Division Multiplexing) of SL or UL, one of CP-OFDM (Cyclic-Prefix OFDM), DFT-S-OFDM (Discrete Fourier Transform-Spread-OFDM), OFDM without transform precoding, and OFDM with transform precoding may be applied.

In SL of LTE, Mode 3 and Mode 4 are specified for resource allocation of SL to a terminal 20. In Mode 3, transmission resources are dynamically allocated by DCI (Downlink Control Information) transmitted from a base station 10 to a terminal 20. Further, in Mode 3, SPS (Semi-Persistent Scheduling) is also possible. In Mode 4, a terminal 20 autonomously selects transmission resources from a resource pool.

Note that a slot in an embodiment of the present invention may be read as a symbol, a mini slot, a subframe, a radio frame, or a TTI (Transmission Time Interval). Also, a cell in an embodiment of the present invention may be read as a cell group, a carrier component, a BWP, a resource pool, a resource, RAT (Radio Access Technology), a system (including a wireless LAN), or the like.

Figure 2:
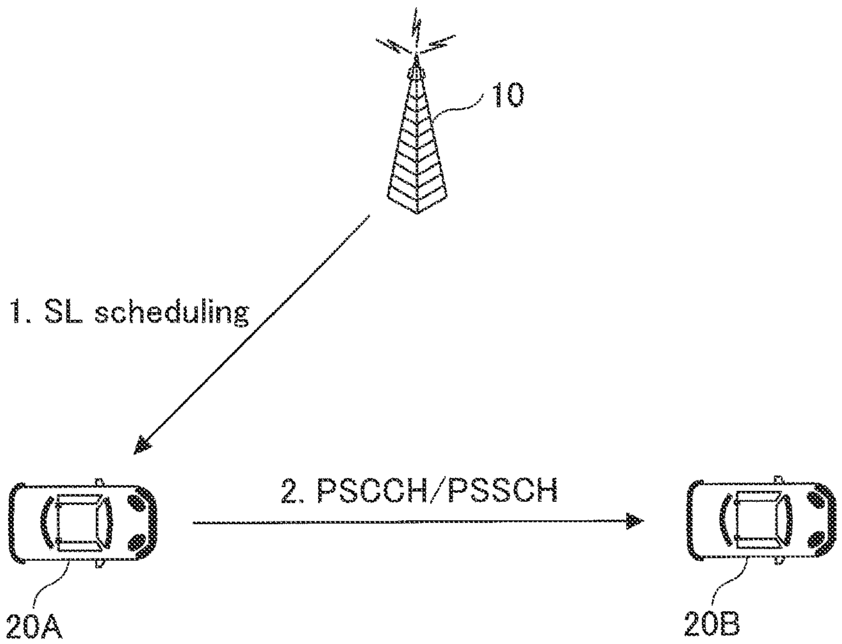
FIG. 2 is a diagram illustrating an example (1) of a transmission mode of V2X.

FIG. 2 is a diagram illustrating an example (1) of a transmission mode of V2X. In the transmission mode of sidelink communication illustrated in FIG. 2, at Step 1, the base station 10 transmits sidelink scheduling to the terminal 20A. Next, the terminal 20A transmits a PSCCH (Physical Sidelink Control Channel) and a PSSCH (Physical Sidelink Shared Channel) to the terminal 20B based on the received scheduling (Step 2). The transmission mode of the sidelink communication illustrated in FIG. 2 may be referred to as sidelink transmission mode 3 in LTE. In the sidelink transmission mode 3 in LTE, Uu-based sidelink scheduling is performed. Uu is a radio interface between UTRAN (Universal Terrestrial Radio Access Network) and UE (User Equipment). Note that the transmission mode of the sidelink communication illustrated in FIG. 2 may be referred to as sidelink transmission mode 1 in NR.

Figure 3:
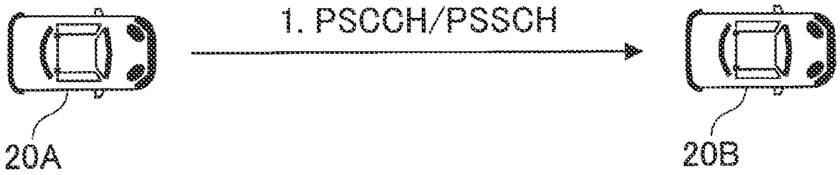
FIG. 3 is a diagram illustrating an example (2) of a transmission mode of V2X.

FIG. 3 is a diagram illustrating an example (2) of a transmission mode of V2X. In the transmission mode of sidelink communication illustrated in FIG. 3, at Step 1, the terminal 20A transmits a PSCCH and a PSSCH to the terminal 20B using autonomously selected resources. The transmission mode of the sidelink communication illustrated in FIG. 3 may be referred to as sidelink transmission mode 4 in LTE. In the sidelink transmission mode 4 in LTE, the UE performs selection of resources by itself.

Figure 4:
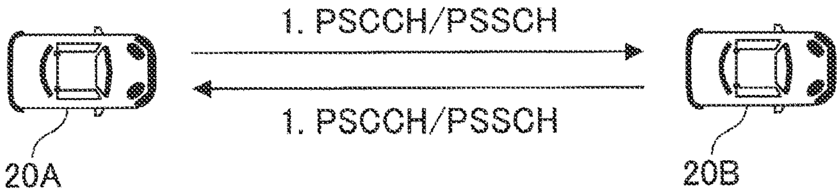
FIG. 4 is a diagram illustrating an example (3) of a transmission mode of V2X.

FIG. 4 is a diagram illustrating an example (3) of a transmission mode of V2X. In the transmission mode of sidelink communication illustrated in FIG. 4, at Step 1, the terminal 20A transmits a PSCCH and a PSSCH to the terminal 20B using autonomously selected resources. Similarly, the terminal 20B transmits PSCCH and PSSCH to the terminal 20A using autonomously selected resources (Step 1). The transmission mode of the sidelink communication illustrated in FIG. 4 may be referred to as sidelink transmission mode 2*a* in NR. In the sidelink transmission mode 2 in NR, the terminal 20 itself performs resource selection.

Figure 5:
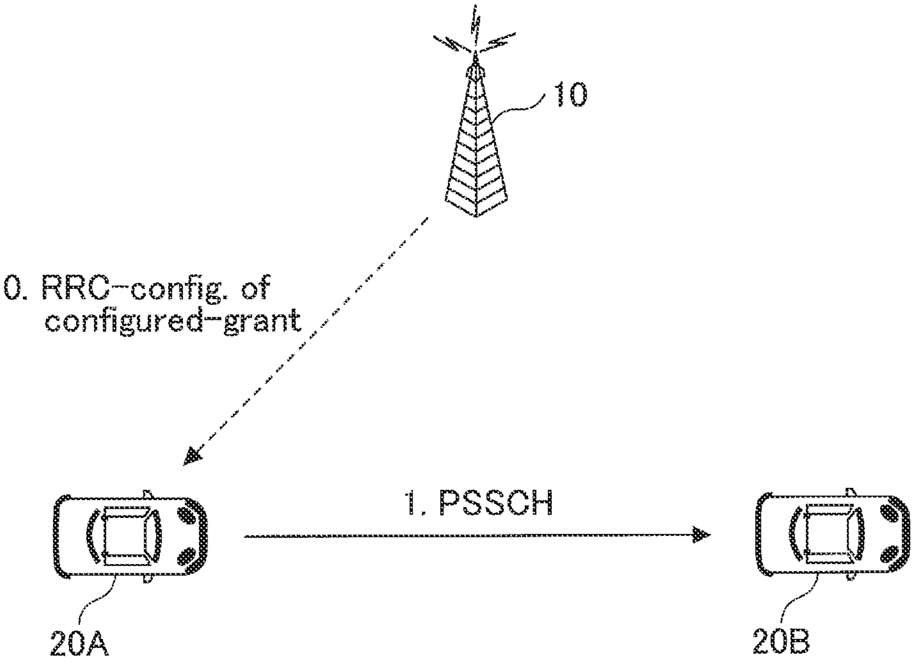
FIG. 5 is a diagram illustrating an example (4) of a transmission mode of V2X.

FIG. 5 is a diagram illustrating an example (4) of a transmission mode of V2X. In the transmission mode of sidelink communication illustrated in FIG. 5, at Step 0, the base station 10 transmits a sidelink grant to the terminal 20A via an RRC (Radio Resource Control) configuration. Next, the terminal 20A transmits a PSSCH to the terminal 20B based on the received resource pattern (Step 1). The transmission mode of the sidelink communication illustrated in FIG. 5 may be referred to as sidelink transmission mode 2*c* in NR.

Figure 6:
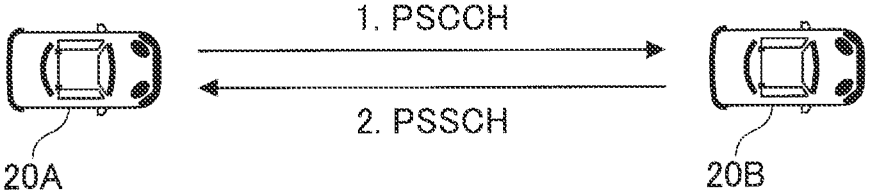
FIG. 6 is a diagram illustrating an example (5) of a transmission mode of V2X.

FIG. 6 is a diagram illustrating an example (5) of a transmission mode of V2X. In the transmission mode of sidelink communication illustrated in FIG. 6, at Step 1, the terminal 20A transmits sidelink scheduling to the terminal 20B via the PSCCH. Next, the terminal 20B transmits the PSSCH to the terminal 20A based on the received scheduling (Step 2). The transmission mode of the sidelink communication illustrated in FIG. 6 may be referred to as sidelink transmission mode 2*d* in NR.

Figure 7:
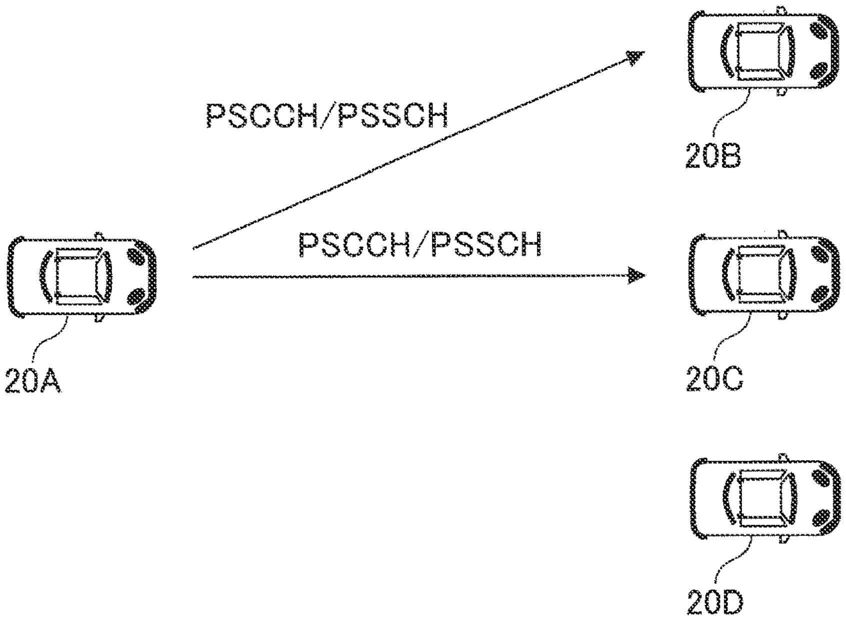
FIG. 7 is a diagram illustrating an example (1) of a communication type of V2X.

FIG. 7 is a diagram illustrating an example (1) of a communication type of V2X. The type of sidelink communication illustrated in FIG. 7 is a unicast. The terminal 20A transmits a PSCCH and a PSSCH to the terminal 20. In the example illustrated in FIG. 7, the terminal 20A performs unicasting to the terminal 20B and performs unicasting to the terminal 20C.

Figure 8:
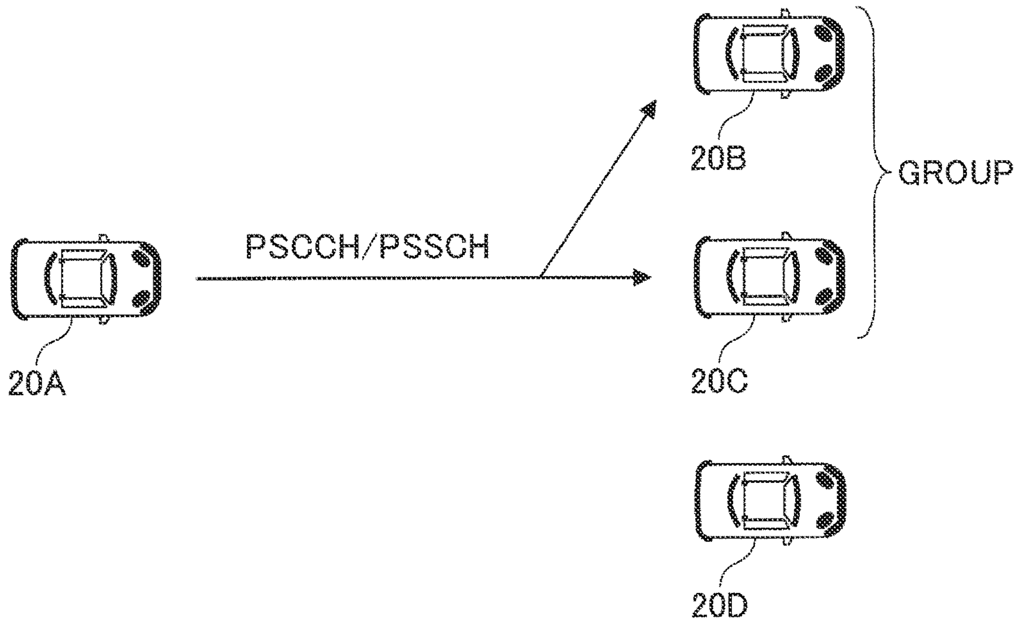
FIG. 8 is a diagram illustrating an example (2) of a communication type of V2X.

FIG. 8 is a diagram illustrating an example (2) of a communication type of V2X. The type of sidelink communication illustrated in FIG. 8 is a groupcast. The terminal 20A transmits a PSCCH and a PSSCH to a group to which one or more terminals 20 belong. In the example illustrated in FIG. 8, the group includes the terminal 20B and the terminal 20C, and the terminal 20A performs groupcasting to the group.

Figure 9:
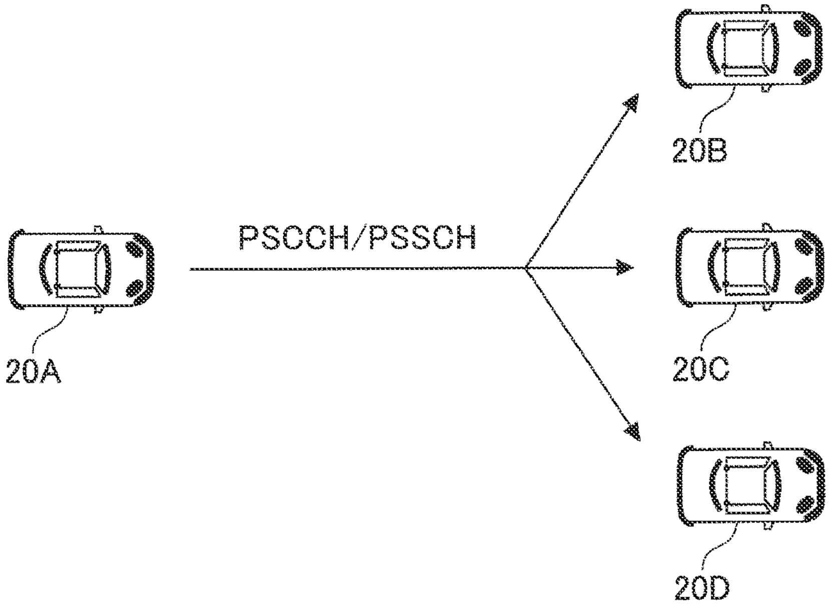
FIG. 9 is a diagram illustrating an example (3) of a communication type of V2X.

FIG. 9 is a diagram illustrating an example (3) of a communication type of V2X. The type of sidelink communication illustrated in FIG. 9 is a broadcast. The terminal 20A transmits a PSCCH and a PSSCH to one or more terminals 20. In the example illustrated in FIG. 9, the terminal 20A performs broadcasting to the terminal 20B, the terminal 20C, and the terminal 20D. Note that the terminal 20A illustrated in FIGS. 7 to 9 may be referred to as a header UE.

Also, it is envisioned in NR-V2X that HARQ (Hybrid automatic repeat request) is supported for unicasting and groupcasting on a sidelink. Further, in NR-V2X, SFCI (Sidelink Feedback Control Information) including a HARQ response is defined. Further, transmission of SFCI via a PSFCH (Physical Sidelink Feedback Channel) is being discussed.

Note that in the following description, although it is assumed that a PSFCH is used when transmitting HARQ-ACK on a sidelink, it is merely an example. For example, a PSCCH may be used for transmitting HARQ-ACK on a sidelink; a PSSCH may be used for transmitting HARQ-ACK on a sidelink; or another channel may be used for transmitting HARQ-ACK on a sidelink.

In the following, for the sake of convenience, the entirety of information reported by the terminal 20 in a HARQ will be referred to as HARQ-ACK. This HARQ-ACK may also be referred to as the HARQ-ACK information. Also, more specifically, a codebook applied to information on HARQ-ACK reported from the terminal 20 to the base station 10 or the like will be referred to as the HARQ-ACK codebook. The HARQ-ACK codebook specifies a bit sequence of HARQ-ACK information. Note that not only ACK but also NACK are transmitted according to "HARQ-ACK".

Figure 10:
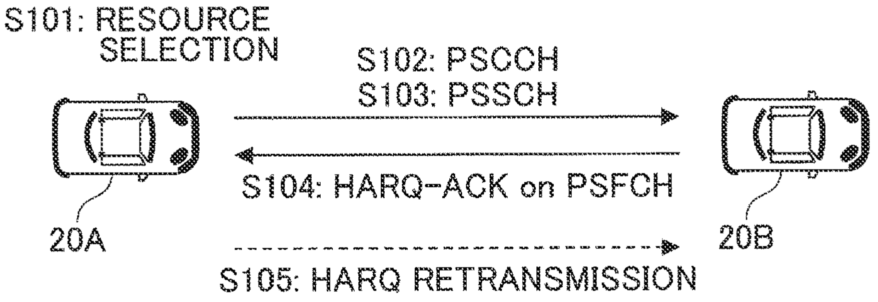
FIG. 10 is a diagram illustrating an example (1) of operations in an embodiment according to the present invention.

FIG. 10 is a diagram illustrating an example (1) of a configuration and operations of a radio communication system in an embodiment according to the present invention. As illustrated in FIG. 10, the radio communication system according to an embodiment according to the present invention includes a terminal 20A and a terminal 20B. Note that in practice, although there may be a number of user devices, FIG. 10 illustrates a terminal 20A and a terminal 20B as an example.

In the following, in the case where the terminals 20A, 20B, and the like are not distinguished in particular, these may be simply described as "terminals 20" or "user device". Although FIG. 10 illustrates a case in which both the terminal 20A and the terminal 20B are within the coverage, operations in the present embodiment can be applied to the case of the terminal 20 being out of the coverage.

As described earlier, in the present embodiment, the terminal 20 is a device, for example, installed in a vehicle such as an automobile, and has the functions of cellular communication and the sidelink functions as UE in LTE or NR. Also, the terminal 20 may be a generic mobile terminal (such as a smartphone). Also, the terminal 20 may be an RSU. The RSU may be a UE-type RSU having UE functions, or may be a gNB-type RSU having functions of a base station apparatus.

Note that the terminal 20 does not need to be a device in a single housing; for example, even in the case of having various sensors distributed and arranged within a vehicle, the device including the various sensors constitutes a terminal 20.

Also, the contents of operations on transmission data performed by the terminal 20 on a sidelink are basically the same as those of UL transmission in LTE or NR. For example, the terminal 20 scrambles the codeword of transmission data, modulates it to generate complex-valued symbols, maps the complex-valued symbols (transmission signal) to one or two layers, and performs precoding. Then, the terminal 20 maps the precoded complex-valued symbols to resource elements, generates transmission signals (e.g., complex-valued time-domain SC-FDMA signal), and transmits the signals from the respective antenna ports.

Note that the base station 10 has functions of cellular communication as a base station in LTE or NR and functions of enabling communication with the terminal 20 in the present embodiment (e.g., resource pool configuration, resource allocation, etc.). Also, the base station 10 may be an RSU (gNB-type RSU).

Also, in the radio communication system according to the present embodiment, the signal waveform used by the terminal 20 on an SL or UL may be OFDMA, SC-FDMA, or any other signal waveform.

At Step S101, the terminal 20A autonomously selects resources used for a PSCCH and a PSSCH from a resource selection window having a predetermined period of time. The resource selection window may be configured from the base station 10 on the terminal 20.

At Step S102 and Step S103, using the resources autonomously selected at Step S101, the terminal 20A transmits SCI (Sidelink Control Information) via the PSCCH and SL data via the PSSCH. For example, the terminal 20A may transmit the SCI (PSCCH) using the same time resources as the time resources of the PSSCH, and frequency resources adjacent to the frequency resources of the PSSCH.

The terminal 20B receives the SCI (PSCCH) and the SL data (PSSCH) transmitted from the terminal 20A. The SCI received via the PSCCH may include information on resources of a PSFCH for the terminal 20B to transmit HARQ-ACK in response to receiving the data. The terminal 20A may include the information on the autonomously selected resources in the SCI and transmit the information.

At Step S104, by using the resources of a PSFCH designated in the received SCI, the terminal 20B transmits HARQ-ACK with respect to the received data to the terminal 20A.

At Step S105, in the case where the HARQ-ACK received at Step S104 indicates a request for retransmission, namely, in the case of NACK (negative response), the terminal 20A retransmits a PSCCH and a PSSCH to the terminal 20B. The terminal 20A may retransmit a PSCCH and a PSSCH using autonomously selected resources.

Note that in the case of not performing HARQ control, Step S104 and Step S105 may not be performed.

Figure 11:
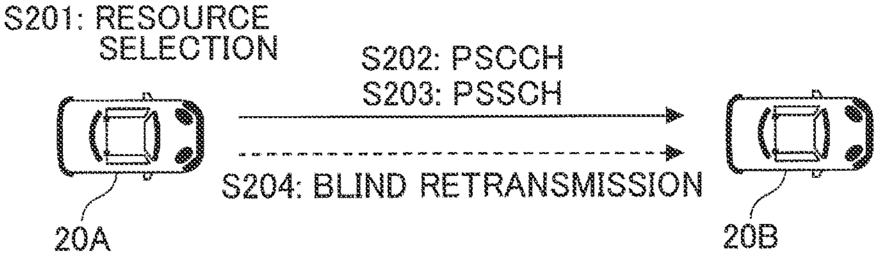
FIG. 11 is a diagram illustrating an example (2) of operations in an embodiment according to the present invention.

FIG. 11 is a diagram illustrating an example (2) of a configuration and operations of a radio communication system in an embodiment according to the present invention. Blind retransmission not relying on HARQ control may be performed to improve the success rate of transmission or the distance to be reached.

At Step S201, the terminal 20A autonomously selects resources used for a PSCCH and a PSSCH from a resource selection window having a predetermined period of time. The resource selection window may be configured from the base station 10 on the terminal 20.

At Step S202 and Step S203, using the resources autonomously selected at Step S201, the terminal 20A transmits SCI via the PSCCH and SL data via the PSSCH. For example, the terminal 20A may transmit the SCI (PSCCH) using the same time resources as the time resources of the PSSCH, and frequency resources adjacent to the frequency resources of the PSSCH.

At Step S204, using the resources autonomously selected at Step S201, the terminal 20A retransmits SCI via the PSCCH and SL data via the PSSCH. Retransmission at Step S204 may be performed multiple times.

Note that in the case of not performing blind retransmission, Step S204 may not be performed.

Figure 12:
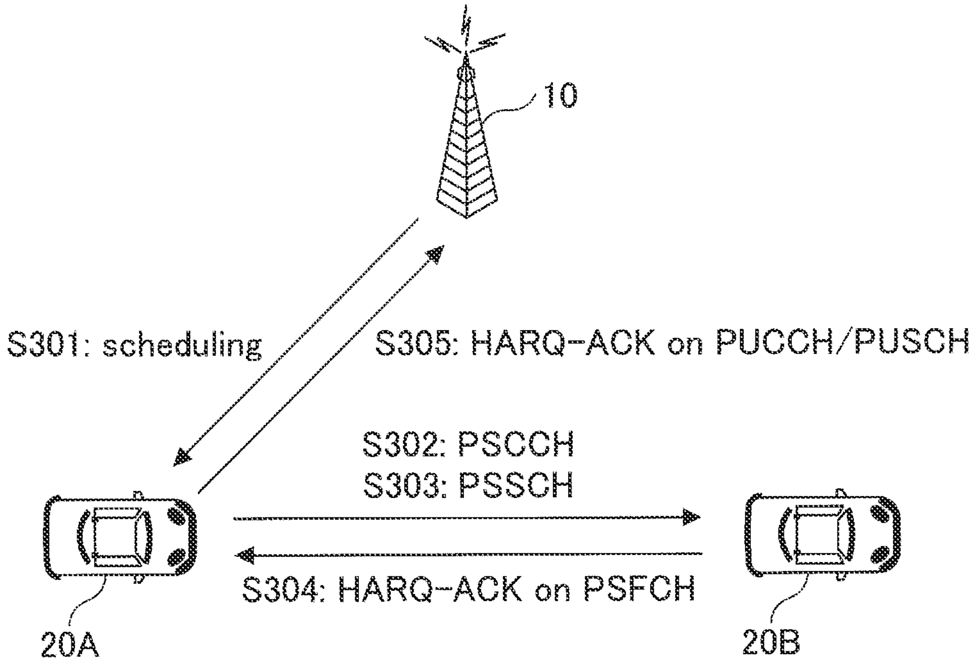
FIG. 12 is a diagram illustrating an example (3) of operations in an embodiment according to the present invention.

FIG. 12 is a diagram illustrating an example (3) of a configuration and operations of a radio communication system in an embodiment according to the present invention. The base station 10 may perform scheduling of a sidelink. In other words, the base station 10 may determine resources of a sidelink to be used by the terminal 20, and transmit information designating the resources to the terminal 20. Further, in the case of applying HARQ control, the base station 10 may transmit information designating resources of an HSFCH to the terminal 20.

At Step S301, the base station 10 performs SL scheduling for the terminal 20A, by transmitting DCI (Downlink Control Information) on a PDCCH. In the following, for the sake of convenience, DCI for SL scheduling will be referred to as SL scheduling DCI.

Also, at Step S301, it is assumed that the base station 10 also transmits DCI for DL scheduling (may also be referred to as DL allocation) to the terminal 20A via the PDCCH. In the following, for the sake of convenience, DCI for DL scheduling will be referred to as DL scheduling DCI. The terminal 20A that has received the DL scheduling DCI receives DL data via the PDSCH using the resources designated in the DL scheduling DCI.

At Step S302 and Step S303, using the resources designated in the SL scheduling DCI, the terminal 20A transmits SCI (Sidelink Control Information) via the PSCCH and SL data via the PSSCH. Note that it is also possible to assume that the SL scheduling DCI specifies only the resources of a PSSCH. In this case, for example, the terminal 20A may transmit the SCI (PSCCH) using the same time resources as the time resources of the PSSCH, and frequency resources adjacent to the frequency resources of the PSSCH.

The terminal 20B receives the SCI (PSCCH) and the SL data (PSSCH) transmitted from the terminal 20A. The SCI received via the PSCCH includes information on resources of a PSFCH for the terminal 20B to transmit HARQ-ACK in response to receiving the data.

The information on the resources is included in the DL scheduling DCI or the SL scheduling DCI transmitted from the base station 10 at Step S301, and the terminal 20A obtains the information on the resources from the DL scheduling DCI or the SL scheduling DCI and includes the information in the SCI. Alternatively, it may be assumed that the DCI transmitted from the base station 10 does not include the information on the resources, and the terminal 20A autonomously includes the information on the resources in the SCI to transmit the information.

At Step S304, by using the resources of a PSFCH designated in the received SCI, the terminal 20B transmits HARQ-ACK with respect to the received data to the terminal 20A.

At Step S305, the terminal 20A transmits HARQ-ACK using PUCCH resources designated in the DL scheduling DCI (or the SL scheduling DCI) at a timing (e.g., a timing in the units of slots) designated in the DL scheduling DCI, and the base station 10 receives the HARQ-ACK. The HARQ-ACK codebook may include HARQ-ACK received from the terminal 20B and HARQ-ACK with respect to the DL data. However, in the case where no DL data is allocated or the like, HARQ-ACK for DL data is not included.

Note that in the case of not performing HARQ control, Step S304 and Step S305 may not be performed.

When transmitting or receiving an NR-SL, an MCS (Modulation and Coding Scheme) table used in NR-Rel-15 may be used. For example, the following Table 1, Table 2, and Table 3 are examples of MCS tables used in NR-Rel-15 for CP-OFDM (Cyclic Prefix-Orthogonal Frequency Division Multiplexing) in communication between a terminal and a base station.

TABLE 1

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| . | . | . | . |
| . | . | . | . |
| . | . | . | . |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 2

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| . | . | . | . |
| . | . | . | . |
| . | . | . | . |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

TABLE 3

| MCS Index $I_{MCS}$ | Modulation Order $Q_m$ | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| . | . | . | . |
| . | . | . | . |
| . | . | . | . |
| 27 | 6 | 719 | 4.2129 |
| 28 | 6 | 772 | 4.5234 |
| 29 | 2 | reserved | |
| 30 | 4 | reserved | |
| 31 | 6 | reserved | |

As shown in Table 1, Table 2, and Table 3, the MCS table associates an MCS index with a modulation order "Qm" and a target code rate "R".

The three MCS tables shown as Table 1, Table 2, and Table 3 may be selected depending on the communication situation. For example, the MCS table shown in Table 2 may be used when a modulation order of Qm=8 is configurable, namely, 256 QAM (Quadrature amplitude modulation) is configurable.

For example, in an NR-SL, at least one MCS table may be configured or specified in advance for each resource pool. Also, for example, an MCS table configured in a resource pool may be modified by RRC signaling or may be modified by SCI. Also, for example, each resource pool may be configured to use only one PSCCH format (PSCCH configuration) for a PSCCH for the first SCI. Note that the SCI may be partitioned into two stages, and the first SCI may be one of the two stages.

Here, in Table 1 and Table 3, MCS indices of 29, 30, and 31 are reserved. In Table 2, MCS indices of 28, 29, 30, and 31 are reserved. In communication between a terminal and a base station in NR, it is assumed that a reserved MCS index is used upon retransmission.

The same TBS (Transport block size) needs to be designated upon retransmission. Meanwhile, the same TBS limits the set of parameters to be scheduled (e.g., MCS, resources in the time domain and the frequency domain, the number of layers, the configuration of DM-RS, etc.). Thereupon, in the case where the terminal 20 receives DCI including a reserved MCS index, it is assumed that the TBS is the same as in a PDSCH (Physical Downlink Shared Channel) or PUSCH (Physical Uplink Shared Channel) designated in the most recent DCI among DCI in which the same HPN (HARQ process number) is designated and the NDI (New data indicator) is not toggled.

For example, in the case where the base station 10 performs an initial transmission of the transport block with setting the MCS index to 10 using Table 1, and receives a NACK response from the terminal 20, it is assumed that the modulation order is to be changed to improve the reachability upon retransmission. Meanwhile, the TBS needs to be the same; therefore, the base station 10 may retransmit the transport block to the terminal 20, using the MCS index 29 to change the modulation order 4 corresponding to the MCS index 10 to the modulation order 2. This eliminates the constraints on the set of parameters to be scheduled, and thereby, can improve the flexibility of scheduling.

However, in the case of using DCI including a reserved MCS index, the TBS of the transport block to be retransmitted becomes unknown on the receiving side if the previous DCI was not received correctly.

In the case of an NR-SL, the terminal 20 can select resources autonomously and half-duplex communication is performed, it is assumed that reception of a PSCCH on the terminal 20 fails more frequently than reception of a PDCCH in communication between a terminal and a base station in NR.

Thereupon, by associating a reserved MCS index with a particular operation of the terminal 20 in an NR-SL, efficient control is implemented even in an environment where the success rate of PSCCH reception is not high.

Figure 13:
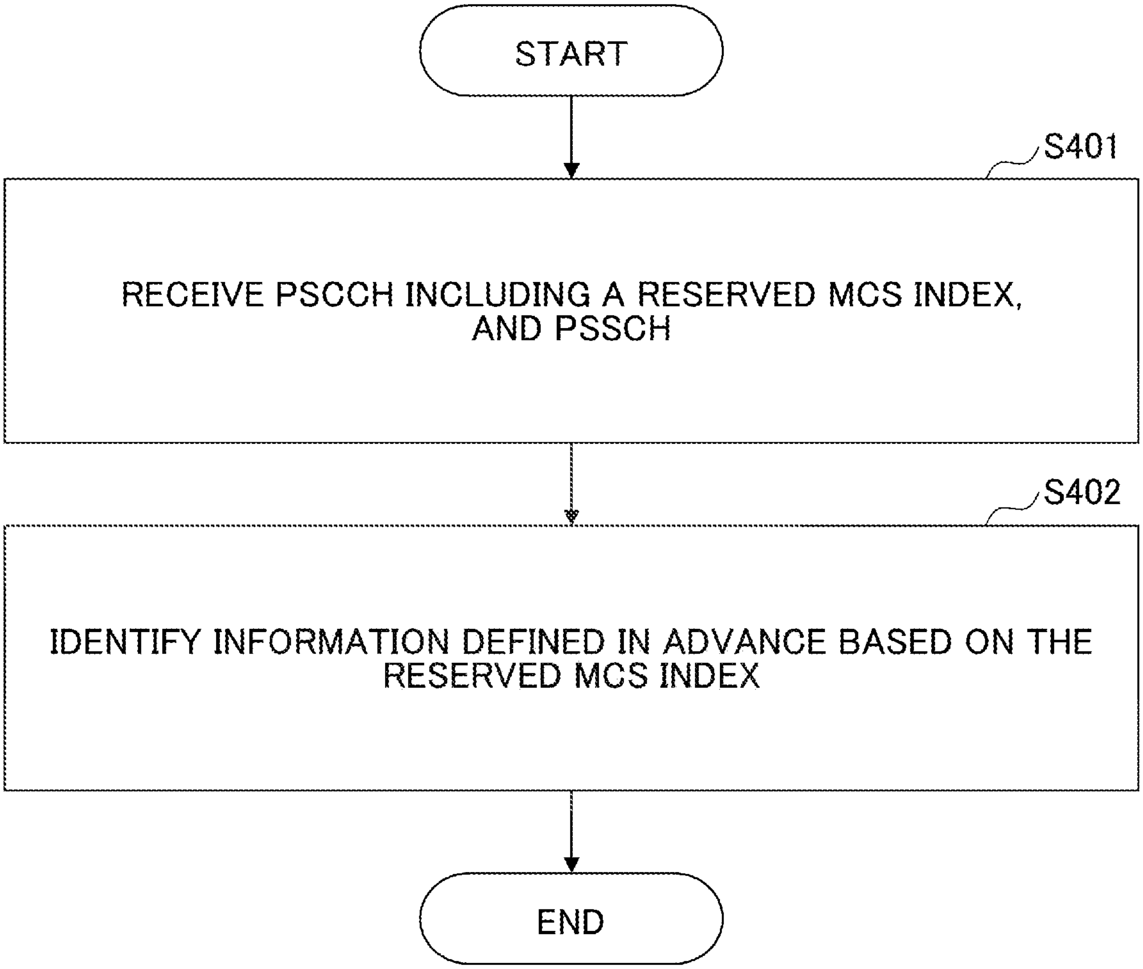
FIG. 13 is a flow chart illustrating an example of operations of a terminal on the receiving side of reserved information in an embodiment according to the present invention.

FIG. 13 is a flow chart illustrating an example of operations of a terminal on the receiving side of reserved information in an embodiment according to the present invention. For example, in the case where a reserved MCS index is indicated in the SCI, the reserved MCS index may be one that indicates another type of information.

At Step S401, the terminal 20 receives a PSCCH including a reserved MCS index, and a PSSCH. Next, the terminal 20 identifies information defined in advance based on the reserved MCS index (S 402). The information defined in advance may be at least one of the following a) to d).

a) Pre-Reservation

On a single subchannel, a PSCCH including a reserved MCS index, and/or a PSSCH may be transmitted, and resources in multiple subchannels for retransmission of the corresponding transport block may be reserved with the PSCCH and/or the PSSCH. Also, on a single subchannel, a PSCCH including a reserved MCS index, and/or a PSSCH may be transmitted, and resources in multiple subchannels for the initial transmission and/or the retransmission of the transport block may be reserved with the PSCCH and/or the PSSCH. Note that pre-reservation may be performed using a field of the SCI other than the MCS index field. Also, the reserved resources may be used for transmission of a different transport block, or may be used for transmission other than transmission of a transport block.

For example, a PSCCH and a PSSCH for an initial transmission on a single subchannel may reserve resources on multiple subchannels for retransmission of the transport block. The RE (Resource Element) of the PSSCH of the initial transmission may include SCI and data related to the retransmission.

Also, for example, a PSCCH and a PSSCH for an initial transmission on a single subchannel may reserve resources on multiple subchannels for the initial transmission and an optional retransmission of the transport block. The RE of the PSSCH of the initial transmission may include only SCI related to retransmission.

b) Preemption

The terminal 20 may transmit a reserved MCS index in the SCI, to preempt (overwrite a reservation of) resources that have been already reserved by another terminal 20, for using the resources in a communication having a higher priority.

c) MCS Not Present in an MCS Table Being Used

The terminal 20 may transmit a reserved MCS index in the SCI, to indicate an MCS that is not present in an MCS table that is being used.

d) No Corresponding PSSCH Transmission

The terminal 20 may transmit a reserved MCS index in the SCI, to indicate the absence of a corresponding PSSCH transmission. For example, it may indicate that only a PSCCH is to be transmitted.

As described in a) to d) as above, the terminal 20 on the transmitting side that transmits a reserved MCS index in the SCI, enables the terminal 20 on the receiving side to identify the information defined in advance, and thereby, the size of the SCI can be reduced as small as possible.

Figure 14:
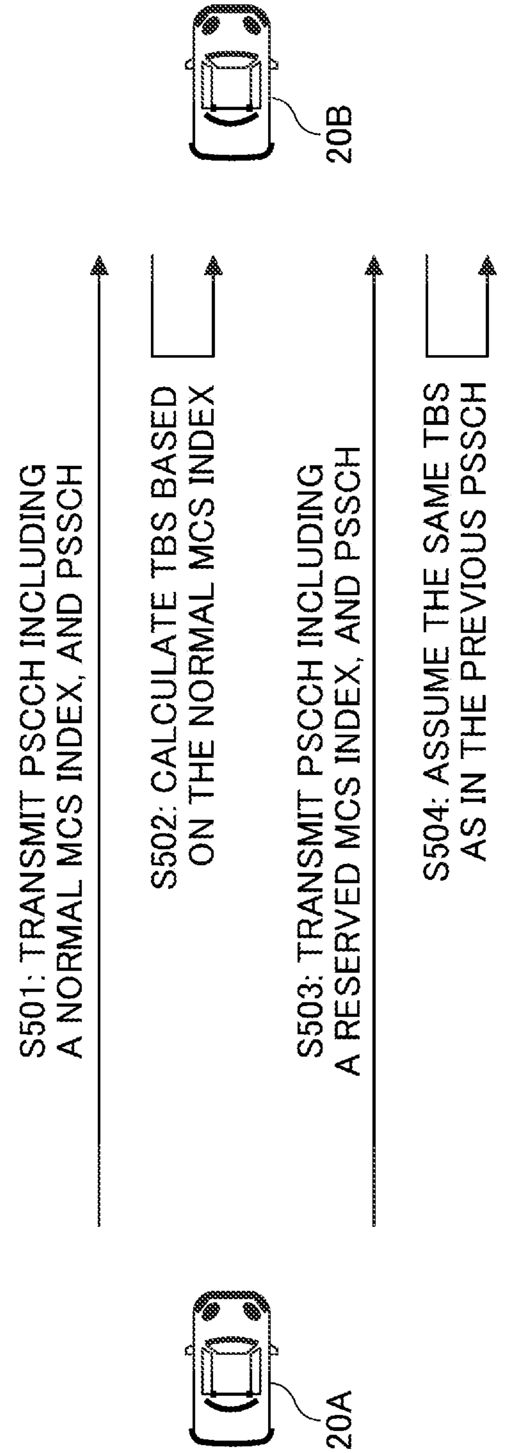
FIG. 14 is a sequence chart illustrating an example (1) of transmitting reserved information in an embodiment according to the present invention.
Figure 15:
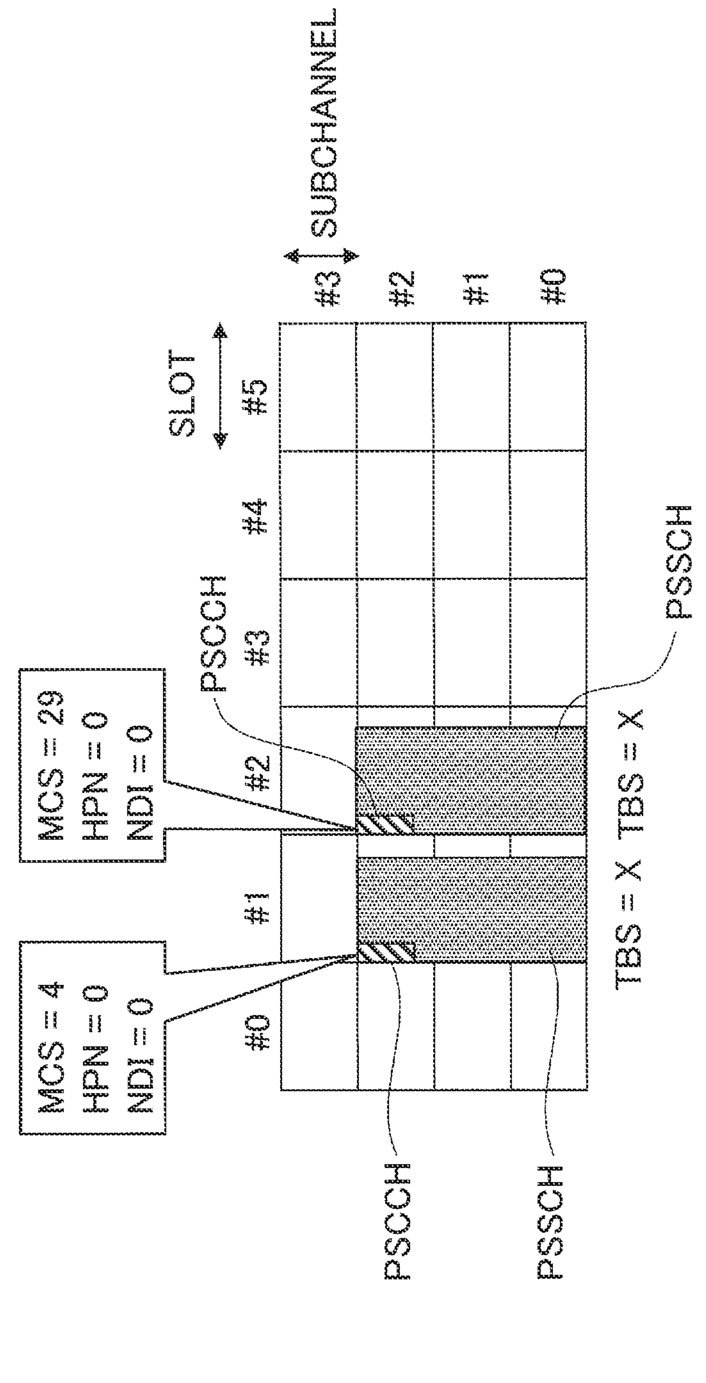
FIG. 15 is a diagram illustrating an example (1) of transmitting reserved information in an embodiment according to the present invention.

FIG. 14 is a sequence chart illustrating an example (1) of transmitting reserved information in an embodiment according to the present invention. FIG. 15 is a diagram illustrating an example (1) of transmitting reserved information in an embodiment according to the present invention. In the case where the terminal 20 receives SCI including a reserved MCS index, the terminal 20 may assume that the TBS is the same as in a PSSCH designated in the most recent SCI among SCIs in which the same HPN is designated; and/or the NDI is not toggled; and/or the same source ID is designated; and/or the same destination ID is designated. FIG. 15 is an example in which three subchannels #0, #1, and #2 are used for SL transmission.

At Step S501, the terminal 20A transmits a PSCCH including a normal MCS index as the initial transmission, and a PSSCH to the terminal 20B. For example, as illustrated in the slot #1 in FIG. 15, SCI in which MCS=4, HPN=0, and NDI=0 are set may be transmitted via the PSCCH. At Step S502, the terminal 20B calculates the TBS of the received transport block via the PSSCH, based on the received normal MCS index. For example, as illustrated in the slot #1 in FIG. 15, the terminal 20B may calculate it as TBS=X.

At Step S503, the terminal 20A transmits a PSCCH including a reserved MCS index as the retransmission, and a PSSCH to the terminal 20B. For example, as illustrated in the slot #1 in FIG. 15, SCI in which MCS=4, HPN=0, and NDI=0 are set may be transmitted via the PSCCH. At Step S504, the terminal 20B that has received the PSCCH including the reserved MCS index, and the PSSCH, assumes the same TBS as in the previous PSSCH. For example, the TBS is X for the transport block received via the PSSCH in the slot #1 in FIG. 15; therefore, the terminal 20B may assume that the TBS is X for the transport block received via the PSSCH in the slot #2. Note that the two PSCCH/PSSCH transmissions in FIG. 15 may be associated with the same source ID and/or the same destination ID.

As illustrated in FIGS. 14 and 15, by transmitting a reserved MCS index, the terminal 20 on the transmitting side can easily indicate, to the terminal 20 on the receiving side, the TBS in the initial transmission and the retransmission, and hence, the flexibility of resource arrangement is improved.

Note that when SCI including a reserved MCS index is indicated, operations of the terminal 20 may be determined by the UE implementation. For example, the terminal 20 does not need to assume performing transmission or reception of the SCI including the reserved index. In the case of not assuming transmission or reception of SCI including a reserved index, operations of the terminal in the case of transmitting or receiving SCI including a reserved index may be unspecified.

Also, for example, in the case where reception of SCI has not succeeded in an initial transmission, if using an MCS index reserved for the SCI in the retransmission, the terminal 20 on the receiving side cannot obtain the TBS in the retransmission. In contrast, in the case where reception of SCI has not succeeded in the initial transmission, by using a normal MCS index in SCI upon retransmission instead of using a reserved MCS index, the terminal 20 on the receiving side can obtain the TBS upon the retransmission.

Figure 16:
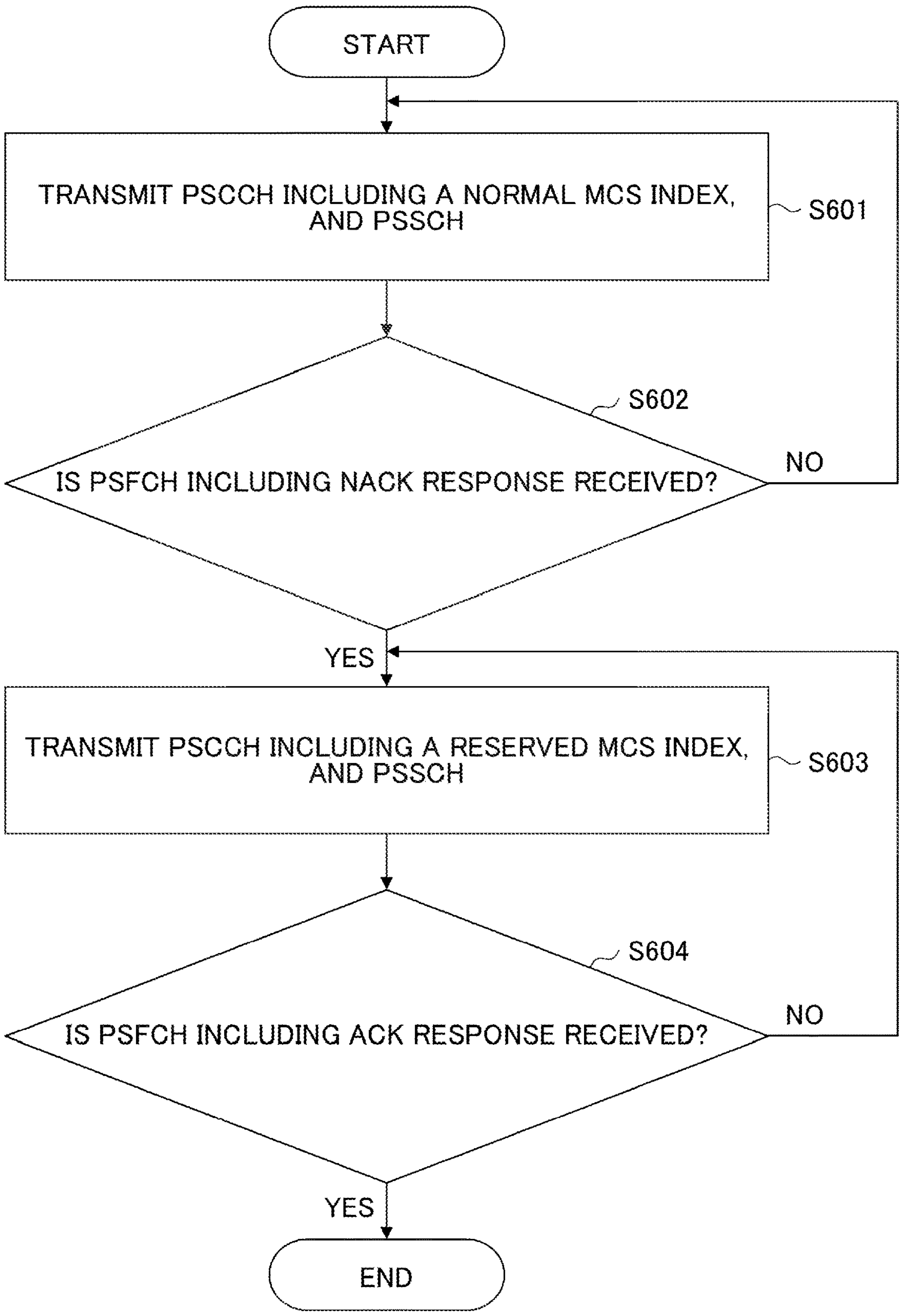
FIG. 16 is a flow chart illustrating an example (2) for transmitting reserved information in an embodiment according to the present invention.
Figure 17:
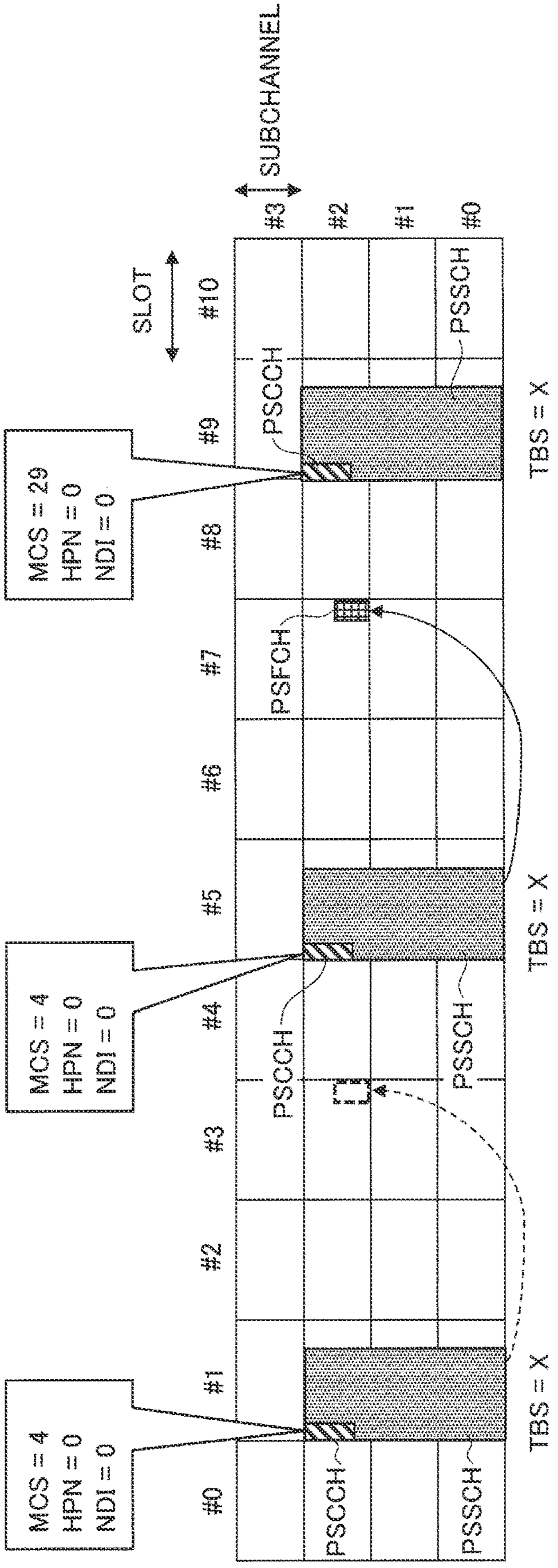
FIG. 17 is a diagram illustrating an example (2) of transmitting reserved information in an embodiment according to the present invention.

FIG. 16 is a flow chart illustrating an example (2) for transmitting reserved information in an embodiment according to the present invention. FIG. 17 is a diagram illustrating an example (2) of transmitting reserved information in an embodiment according to the present invention. With respect to SCI including a reserved MCS index, the UE operation may be changed depending on a specific condition.

FIG. 17 is an example in which three subchannels #0, #1, and #2 are used for SL transmission.

At Step S601, the terminal 20 on the transmitting side transmits a PSCCH including an MCS index as an initial retransmission or retransmission, and a PSSCH to the terminal 20 on the receiving side. For example, as illustrated in the slot #1 in FIG. 17, SCI in which MCS=4, HPN=0, and NDI=0 are set may be transmitted via the PSCCH. The terminal 20 on the receiving side calculates the TBS of the received transport block via the PSSCH, based on the received normal MCS index. For example, as illustrated in the slot #1 in FIG. 17, the terminal 20 on the receiving side may calculate the TBS as X.

At Step S602, the terminal 20 on the transmitting side determines whether or not a PSFCH including a NACK response has been received. If having received a PSFCH including a NACK response (YES at S 602), the process proceeds to Step S603; or if not having received a PSFCH including a NACK response (NO at S 602), the process proceeds to Step S601. For example, in the slot #3 illustrated in FIG. 17, the terminal 20 on the transmitting side did not receive a PSFCH; therefore, in the slot #5, the terminal 20 on the transmitting side may execute Step S601. Also, in the slot #7 illustrated in FIG. 17, the terminal 20 on the transmitting side has received a PSFCH including a NACK response; therefore, in the slot #9, the terminal 20 on the transmitting side may execute Step S603.

At Step S603, the terminal 20 on the transmitting side transmits a PSCCH including a reserved MCS index as the retransmission, and a PSSCH to the terminal 20 on the receiving side. For example, as illustrated in the slot #5 in FIG. 17, SCI in which MCS=29, HPN=0, and NDI=0 are set may be transmitted via the PSCCH. The terminal 20 on the receiving side that has received the PSCCH including the reserved MCS index, and the PSSCH, assumes that the TBS is the same as in a PSSCH designated in the most recent DCI among DCI in which the same HPN is designated; and/or the NDI is not toggled; and/or the same source ID is designated; and/or the same destination ID is designated. For example, the TBS is X for the transport block received via the PSSCH in the slot #5 in FIG. 17; therefore, the terminal 20 on the receiving side may assume that the TBS is X for the transport block received via the PSSCH in the slot #9.

At Step S604, the terminal 20 on the transmitting side determines whether or not a PSFCH including ACK response has been received. If having received a PSFCH including an ACK response (YES at S604), the terminal 20 on the transmitting side ends the flow; or if not having received a PSFCH including an ACK response (NO at S604), the terminal 10 on the transmitting side may proceed to Step S603 to perform the retransmission. Note that if having received a PSFCH including an ACK response at Step S602, the terminal 20 on the transmitting side may end the flow.

As illustrated in FIGS. 16 and 17, the terminal 20 on the transmitting side that transmits SCI including a normal MCS index during a period before receiving a NACK response, enables the terminal 20 on the transmitting side to avoid using a reserved MCS index in the case where it is unknown whether or not the terminal 20 on the receiving side has obtained the TBS. In other words, the terminal 20 on the receiving side can always obtain the TBS corresponding to the received PSSCH. Also, the terminal 20 on the transmitting side that transmits SCI including a reserved MCS index during a period after having received a NACK response, enables the terminal 20 on the transmitting side to know whether or not the terminal 20 on the receiving side has obtained the TBS. Therefore, the terminal 20 on the transmitting side can use the reserved MCS index.

According to the application examples described above, the terminal 20 on the transmitting side that transmits a reserved MCS index in the SCI, enables the terminal 20 on the receiving side to identify the information defined in advance, and thereby, the size of the SCI can be reduced as small as possible. Transmitting a reserved MCS index between the terminals 20 enables the terminal 20 on the transmitting side to easily indicate, to the terminal 20 on the receiving side, the TBS in the initial transmission and the retransmission, and hence, the flexibility of resource arrangement is improved. Also, by using a normal MCS index in SCI upon retransmission instead of using a reserved MCS index, the terminal 20 on the receiving side can obtain the TBS upon the retransmission. Also, the terminal 20 on the transmitting side that transmits SCI including a normal MCS index during a period before receiving a NACK response, enables the terminal 20 on the receiving side to certainly obtain the TBS corresponding to the received PSSCH. Also, the terminal 20 on the transmitting side that transmits SCI including a reserved MCS index during a period after having received a NACK response, enables the terminal 20 on the transmitting side to use the reserved MCS index.

In other words, it is possible to determine operations of a terminal based on the reserved information in direct communication between terminals.

(Apparatus Configuration)

Next, an example of a functional configuration of the base station 10 and the terminal 20 to execute the processes and operations described above, will be described. The base station 10 and the terminal 20 include the functions of implementing the application examples described above. However, each of the base station 10 and the terminal 20 may include only a part of the functions of the application examples.

<Base Station 10>

Figure 18:
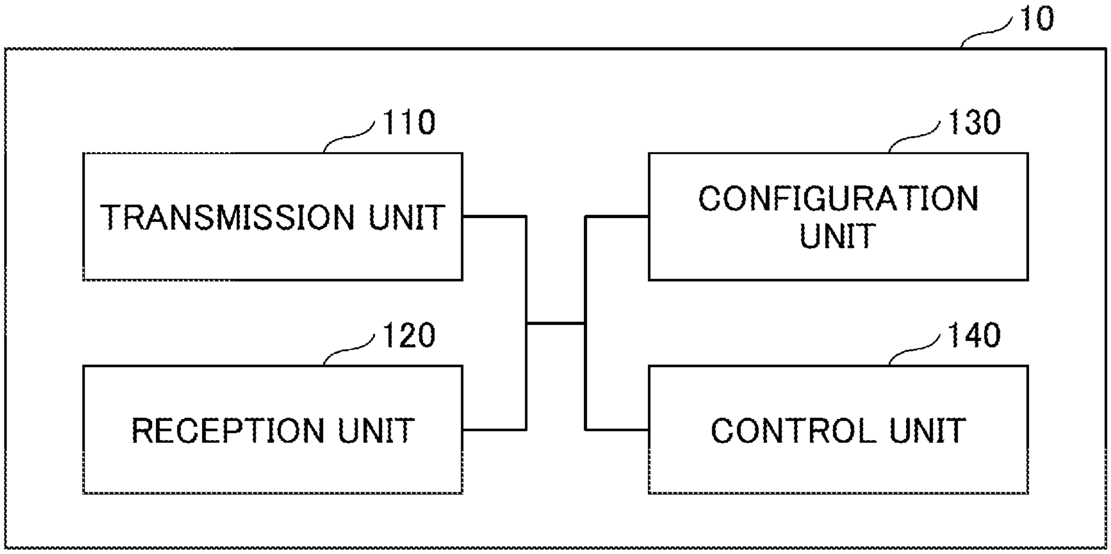
FIG. 18 is a diagram illustrating an example of a functional configuration of a base station 10 according to an embodiment of the present invention.

FIG. 18 is a diagram illustrating an example of a functional configuration of the base station 10. As illustrated in FIG. 18, the base station 10 includes a transmission unit 110, a reception unit 120, a configuration unit 130, and a control unit 140. The functional configuration illustrated in FIG. 18 is merely an example. Functional partitioning and names of the functional units may be determined discretionarily as long as operations can be executed according to the embodiments of the present invention.

The transmission unit 110 includes a function of generating a signal to be transmitted to the terminal 20 and transmitting the signal by radio. The reception unit 120 includes a function of receiving various signals transmitted from the terminal 20 and obtaining information on an upper layer, for example, from the received signals. The transmission unit 110 also includes a function of transmitting NR-PSS, NR-SSS, NR-PBCH, DL/UL control signals, DL reference signals, and the like to the terminal 20.

The configuration unit 130 stores configuration information set in advance and various items of configuration information to be transmitted to the terminal 20 in a storage device, and reads out the configuration information from the storage device as needed. The contents of the configuration information include, for example, information related to a configuration of D2D communication and the like.

As described in the application examples, the control unit 140 performs processing related to a configuration for the terminal 20 to perform D2D communication. Also, the control unit 140 transmits scheduling of D2D communication and DL communication to the terminal 20 via the transmission unit 110. Also, the control unit 140 receives information on HARQ responses of the D2D communication and the DL communication from the terminal 20 via the reception unit 120. A functional unit for transmitting signals in the control unit 140 may be included in the transmission unit 110, and a functional unit for receiving signals in the control unit 140 may be included in the reception unit 120.

<Terminal 20>

Figure 19:
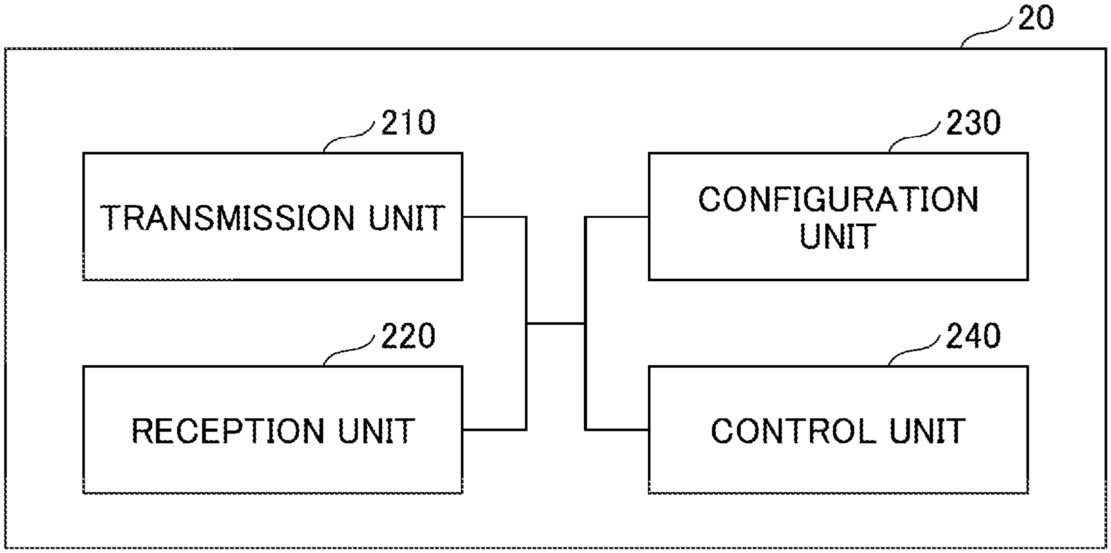
FIG. 19 is a diagram illustrating an example of a functional configuration of a terminal 20 according to an embodiment of the present invention.

FIG. 19 is a diagram illustrating an example of a functional configuration of a terminal 20. As illustrated in FIG. 19, the terminal 20 includes a transmission unit 210, a reception unit 220, a configuration unit 230, and a control unit 240. The functional configuration illustrated in FIG. 19 is merely an example. Functional partitioning and names of the functional units may be determined discretionarily as long as operations can be executed according to the embodiments of the present invention.

The transmission unit 210 generates a transmission signal from transmission data, to transmit the transmission signal by radio. The reception unit 220 receives various signals by radio and obtains a signal of an upper layer from a received signal via the physical layer. Also, the reception unit 220 includes a function of receiving NR-PSS, NR-SS, NR-PBCH, DL/UL/SL control signals, reference signals, or the like transmitted from the base station 10. Also, for example, the transmission unit 210 transmits a PSCCH (Physical Sidelink Control Channel), PSSCH (Physical Sidelink Shared Channel), PSDCH (Physical Sidelink Discovery Channel), PSBCH (Physical Sidelink Broadcast Channel), or the like to other terminals 20 as D2D communication, and the reception unit 220 receives a PSCCH, PSSCH, PSDCH, or PSBCH from another terminal 20.

The configuration unit 230 stores various items of configuration information received by the reception unit 220 from the base station 10 or the terminal 20 in a storage device, and reads out the configuration information from the storage device as needed. The configuration unit 230 also stores configuration information set in advance. The contents of the configuration information include, for example, information related to a configuration of D2D communication and the like.

The control unit 240 controls D2D communication with the other terminals 20 as described in the application examples. Also, the control unit 240 performs processing related to HARQ of the D2D communication and the DL communication. Also, the control unit 240 transmits information on HARQ responses of the D2D communication and the DL communication to another terminal 20 scheduled from the base station 10. In addition, the control unit 240 may perform scheduling of the D2D communication applied to the other terminals 20. Also, the control unit 240 may autonomously select the resources used for the D2D communication from the resource selection window. Also, the control unit 240 performs processing related to the MCS upon transmission and reception in D2D communication. A functional unit for transmitting signals in the control unit 240 may be included in the transmission unit 210, and a functional unit for receiving signals in the control unit 240 may be included in the reception unit 220.

(Hardware Configuration)

The block diagrams (FIGS. 18 and 19) used for describing the above embodiments show blocks in functional units. These functional blocks (components) are implemented by any combination of hardware and/or software. Further, the method of implementing the functional blocks is not limited in particular. In other words, each functional block may be implemented by using one device that is physically or logically coupled, or two or more devices that are physically or logically separated may be connected directly or indirectly (e.g., by wire or by radio) so as to implement the functional block. The functional blocks may be implemented by one or more of the above devices in combination with software.

Functions include, but are not limited to, judgment, decision, determination, calculation, computation, processing, derivation, investigation, search, confirmation, reception, transmission, output, access, resolution, selection, choice, establishment, comparison, assumption, expectation, deeming, broadcasting, notifying, communicating, forwarding, configuring, reconfiguring, allocating, mapping, and assigning. For example, a functional block (component) that implements a function of transmission may be referred to as a transmitting unit or a transmission unit. In any case, as described above, implementation methods are not limited in particular.

Figure 20:
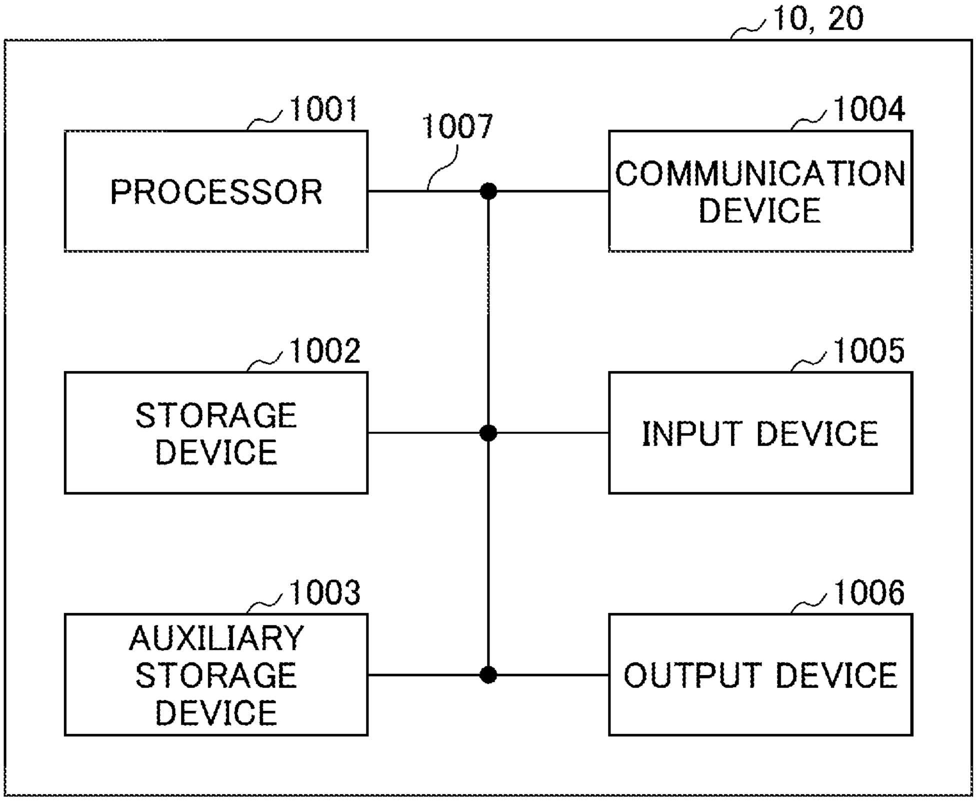
FIG. 20 is a diagram illustrating an example of a hardware configuration of the base station 10 or the terminal 20 according to an embodiment of the present invention.

For example, the base station 10, the terminal 20, or the like in an embodiment of the present disclosure may function as a computer that processes a radio communication method of the present disclosure. FIG. 20 is a diagram illustrating an example of a hardware configuration of the base station 10 and the terminal 20 according to an embodiment of the present disclosure. The base station 10 and terminal 20 described above may be physically configured as a computer device that includes a processor 1001, a storage device 1002, an auxiliary storage device 1003, a communication device 1004, an input device 1005, an output device 1006, and a bus 1007.

Note that in the following description, the term "apparatus" can be read as a circuit, device, unit, or the like. The hardware configuration of the base station 10 and the terminal 20 may be configured to include one or more of the devices illustrated in the drawings or may be configured without including some of the devices.

Each function in the base station 10 and the terminal 20 is implemented by loading predetermined software (a program) on the hardware such as the processor 1001 and the storage device 1002 so as to cause the processor 1001 to execute operations, to control communication by the communication device 1004, and to control at least one of reading and writing data in the storage device 1002 and the auxiliary storage device 1003.

The processor 1001 controls the entire computer, for example, by causing an operating system to run. The processor 1001 may be constituted with a central processing unit (CPU) that includes interfaces with peripheral devices, a controller, an arithmetic/logic unit, registers, and the like. For example, the control unit 140, the control unit 240, and the like described above may be implemented by the processor 1001.

The processor 1001 also reads a program (a program code), a software module, data, and the like from at least one of the auxiliary storage device 1003 and the communication device 1004 to the storage device 1002 to perform various processes in accordance with these. As a program, a program that causes the computer to execute at least some of the operations described in the above embodiments is used. For example, the control unit 140 of the base station 10 illustrated in FIG. 18 may be implemented by a control program that is stored in the storage device 1002 and runs on the processor 1001. Also, for example, the control unit 240 of the terminal 20 illustrated in FIG. 19 may be implemented by a control program that is stored in the storage device 1002 and runs on the processor 1001. Although the various processes described above are assumed to be executed by the single processor 1001, these may be executed simultaneously or sequentially by two or more processors 1001. The processor 1001 may be implemented by one or more chips. Note that the program may be transmitted from a network via a telecommunication line.

The storage device 1002 is a computer-readable recording medium, and may be constituted with, for example, at least one of a ROM (Read-Only Memory), an EPROM (Erasable Programmable ROM), an EEPROM (Electrically Erasable Programmable ROM), a RAM (Random Access Memory), and the like. The storage device 1002 may be referred to as a register, a cache, a main memory (a main storage device), or the like. The storage device 1002 is capable of storing a program (a program code), a software module, and the like that are executable to implement the communication method according to an embodiment of the present disclosure.

The auxiliary storage device 1003 is a computer-readable recording medium and may be constituted with, for example, at least one of an optical disk such as a CD-ROM (Compact Disc ROM), a hard disk drive, a flexible disk, an optical magnetic disk (e.g., a compact disk, a digital versatile disk, a Blu-ray (registered trademark) disk, a smart card, a flash memory (e.g., a card, a stick, and a key drive), a floppy (registered trademark) disk, a magnetic strip, and the like. The recording medium described above may be, for example, a database, a server, or any other suitable medium that includes at least one of the storage device 1002 and the auxiliary storage device 1003.

The communication device 1004 is hardware (a transceiver device) for communicating with computers via at least one of a wired network and a wireless network, and is also referred to as, for example, a network device, a network controller, a network card, a communication module, and the like. The communication device 1004 may be configured to include, for example, a radiofrequency switch, a duplexer, a filter, a frequency synthesizer, and the like, for example, to implement at least one of a frequency division duplex (FDD) and a time division duplex (TDD). For example, a transmitting and receiving antenna, an amplifier, a transceiver, a transmission line interface, and the like may be implemented by the communication device 1004. The transceiver may be implemented by a transmission unit and a reception unit that are physically or logically separated.

The input device 1005 is an input device (e.g., a keyboard, a mouse, a microphone, a switch, a button, a sensor, etc.) to receive input from the outside. The output device 1006 is an output device (e.g., a display, a speaker, an LED lamp, etc.) to execute outputting to the outside. Note that the input device 1005 and the output device 1006 may have an integrated configuration (e.g., a touch panel).

Each of the devices such as the processor 1001 and the storage device 1002 is connected via the bus 1007 for communicating information. The bus 1007 may be configured by using a single bus or may be configured by using different buses between specific devices.

The base station 10 and the terminal 20 may also be configured to include hardware such as a microprocessor, a digital signal processor (DSP), an ASIC (Application Specific Integrated Circuit), a PLD (Programmable Logic Device), and an FPGA (Field Programmable Gate Array), and with such hardware, some of or all of the functional blocks may be implemented. For example, the processor 1001 may be implemented by using at least one of these hardware components.

(Summary of Embodiments)

As described above, according to an embodiment according to the present invention, a terminal is provided that includes a transmission unit configured to transmit control information including an index indicating an MCS (Modulation and Coding Scheme) to another terminal; and a control unit configured to include the index that is reserved, in the control information, in a case of indicating, to said another terminal, information defined in advance.

According to the configuration described above, the terminal 20 on the transmitting side that transmits a reserved MCS index in the SCI, enables the terminal 20 on the receiving side to identify the information defined in advance, and thereby, the size of the SCI can be reduced as small as possible. Transmitting a reserved MCS index between the terminals 20 enables the terminal 20 on the transmitting side to easily indicate, to the terminal 20 on the receiving side, the TBS in the initial transmission and the retransmission, and hence, the flexibility of resource arrangement is improved. Also, by using a normal MCS index in SCI upon retransmission instead of using a reserved MCS index, the terminal 20 on the receiving side can obtain the TBS upon the retransmission. Also, the terminal 20 on the transmitting side that transmits SCI including a normal MCS index during a period before receiving a NACK response, enables the terminal 20 on the receiving side to certainly obtain the TBS corresponding to the received PSSCH. Also, the terminal 20 on the transmitting side that transmits SCI including a reserved MCS index during a period after having received a NACK response, enables the terminal 20 on the transmitting side to use the reserved MCS index. In other words, it is possible to determine operations of a terminal based on the reserved information in direct communication between terminals.

The information defined in advance may be any one of a) to d) below:

a) Pre-reservation,
b) Preemption,
c) MCS not present in an MCS table being used, and
d) No corresponding PSSCH (Physical Sidelink Shared Channel) transmission According to the configuration, the terminal 20 on the transmitting side that transmits a reserved MCS index in the SCI, enables the terminal 20 on the receiving side to identify the information defined in advance, and thereby, the size of the SCI can be reduced as small as possible.

The information defined in advance may indicate that a TBS (Transport block size) upon retransmission of a transport block is the same as a TBS of a transport block that has been transmitted immediately before. According to the configuration, transmitting a reserved MCS index between the terminals 20 enables the terminal 20 on the transmitting side to easily indicated, to the terminal 20 on the receiving side, the TBS in the initial transmission and the retransmission, and hence, the flexibility of resource arrangement is improved.

The terminal 20 may further include a reception unit configured to receive a HARQ (Hybrid automatic repeat request) response from said another terminal, wherein during a period after a reception of a negative response by the reception unit, the information defined in advance indicates that the TBS upon retransmission of the transport block is the same as the TBS of the transport block that has been transmitted immediately before. According to the configuration, among the terminals 20, the terminal 20 on the transmitting side that transmits SCI including a reserved MCS index during a period after having received a NACK response, enables the terminal 20 on the transmitting side to use the reserved MCS index.

During a period before the reception of the negative response by the reception unit, the control unit need not include the index that is reserved, in the control information. According to the configuration, among the terminals 20, the terminal 20 on the transmitting side that transmits SCI including a normal MCS index during a period before receiving a NACK response, enables the terminal 20 on the receiving side to certainly obtain the TBS corresponding to the received PSSCH.

Also, according to an embodiment according to the present invention, a communication method is provided that is executed by a terminal; the method includes a transmitting step for transmitting control information including an index indicating an MCS (Modulation and Coding Scheme) to another terminal; and a controlling step for including the index that has been reserved in the control information, in a case of indicating, to said another terminal, information defined in advance.

According to the configuration described above, the terminal 20 on the transmitting side that transmits a reserved MCS index in the SCI, enables the terminal 20 on the receiving side to identify the information defined in advance, and thereby, the size of the SCI can be reduced as small as possible. Transmitting a reserved MCS index between the terminals 20 enables the terminal 20 on the transmitting side to easily indicate, to the terminal 20 on the receiving side, the TBS in the initial transmission and the retransmission, and hence, the flexibility of resource arrangement is improved. Also, by using a normal MCS index in SCI upon retransmission instead of using a reserved MCS index, the terminal 20 on the receiving side can obtain the TBS upon the retransmission. Also, the terminal 20 on the transmitting side that transmits SCI including a normal MCS index during a period before receiving a NACK response, enables the terminal 20 on the receiving side to always obtain the TBS corresponding to the received PSSCH. Also, the terminal 20 on the transmitting side that transmits SCI including a reserved MCS index during a period after having received a NACK response, enables the terminal 20 on the transmitting side to use the reserved MCS index. In other words, it is possible to determine operations of a terminal based on the reserved information in direct communication between terminals.

(Supplement to Embodiments)

As above, the embodiment of the present invention has been described; note that the disclosed invention is not limited to the embodiments, and those skilled in the art would understand various modifications, revisions, alternatives, substitutions, and the like. Although the description has been made by using specific numerical examples to facilitate understanding of the invention, unless otherwise stated, these values are merely examples and any suitable values may be used. Partitioning of the items in the above description is not essential to the present invention, and matters described in two or more items may be used in combination as needed, or a matter described in one item may be applied to another matter described in another item (as long as no inconsistency is introduced). The boundaries of functional units or processing units in the functional block diagrams do not necessarily correspond to the physical boundaries of parts. The operations of the multiple functional units may be performed on a single physical part, or the operation of one functional unit may be performed on multiple physical parts. As for the processing steps described in the embodiments, the order of steps may be exchanged as long as no inconsistency is introduced. Although for the sake of convenience of describing processes, the base station 10 and the terminal 20 have been described by using the functional block diagrams, these apparatuses may be implemented by hardware, software, or a combination of these. The software executed by the processor included in the base station 10 according to the embodiment of the present invention and the software executed by the processor included in the terminal 20 according to the embodiment of the present invention, may be stored, respectively, in a random access memory (RAM), a flash memory, a read-only memory (ROM), an EPROM, an EEPROM, a register, a hard disk (HDD), a removable disk, a CD-ROM, a database, a server, or any other suitable recording medium.

Indication of information is not limited to the aspects and the embodiments described in the present disclosure, and may be done by using other methods. For example, indication of information may be performed by physical layer signaling (e.g., DCI (Downlink Control Information), UCI (Uplink Control Information)), upper layer signaling (e.g., RRC (Radio Resource Control) signaling, MAC (Medium Access Control) signaling, broadcast information (MIB (Master Information Block), SIB (System Information Block)), other signals, or a combination of these. Also, RRC signaling may also be referred to as an RRC message, and may also be, for example, an RRC connection setup message, an RRC connection reconfiguration message, or the like.

The aspects and the embodiments described in the present disclosure may be applied to at least one of systems utilizing LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA 2000, UMB (Ultra Mobile Broadband), IEEE 802.11 (Wi-Fi) (registered trademark), IEEE 802.16 (WiMAX) (registered trademark), IEEE 802.20, UWB (Ultra-WideBand), Bluetooth (registered trademark), and other suitable systems and next-generation systems extended based on these systems. Also, multiple systems may also be combined (e.g., a combination of at least one of LTE and LTE-A with 5G, etc.) to be applied.

The processing steps, sequences, flowcharts, and the like of the aspects and the embodiments described in the present description may be reordered as long as no inconsistency is introduced. For example, a method described in the present disclosure presents elements of various steps using an exemplary order, and is not limited to the particular order presented.

A specific operation described in the present description to be performed by the base station 10 may be performed by its upper node, depending on circumstances. In a network constituted with one or more network nodes having the base station 10, it is apparent that various operations performed for communication with the terminals 20 may be performed by at least one of the base station 10 and other network nodes (for example, an MME or an S-GW may be considered, but not limited to these) other than the base station 10. In the above description, although a case has been exemplified in which there is a single network node other than the base station 10, the other network nodes may be a combination of multiple other network nodes (e.g., MME and S-GW).

Information, signals, and the like described in the present disclosure may be output from an upper layer (or a lower layer) to a lower layer (or an upper layer). These may be input and output through multiple network nodes.

Information that has been input or output may be stored in a specific location (e.g., memory) or managed by using a management table. Information to be input or output may be overwritten, updated, or added. Information that has been output may be deleted. Information that has been input may be transmitted to other devices.

A determination in the present disclosure may be performed based on a value (0 or 1) represented by one bit; may be performed based on a Boolean value (true or false); or may be performed based on comparison with a numerical value (e.g., comparison with a predetermined value).

Regardless of whether it is referred to as software, firmware, middleware, a microcode, a hardware description language, or any other name, software should be broadly interpreted to mean instructions, an instruction set, a code, a code segment, a program code, a program, a subprogram, a software module, an application, a software application, a software package, a routine, a subroutine, an object, an executable file, a thread, a procedure, a function, and the like.

Also, software, instructions, information, and the like may also be transmitted and received via a transmission medium. For example, if the software is transmitted from a web site, a server, or another remote source by using at least one of a wired technology (coaxial cable, optical fiber cable, twisted pair, digital subscriber line (DSL: Digital Subscriber Line), etc.) and a wireless technology (infrared, microwave, etc.), at least one of these wired technologies and wireless technologies is included in the definition of a transmission medium.

The information, signals, and the like described in the present disclosure may be represented by using any of a variety of different technologies. For example, data, an instruction, a command, information, a signal, a bit, a symbol, a chip, or the like, which may be mentioned throughout the entire description, may be represented by a voltage, a current, an electromagnetic wave, a magnetic field, magnetic particles, an optical field, or photons, or any combination of these.

A term described in the present disclosure and a term necessary for understanding the present disclosure may be replaced by a term having the same or similar meaning. For example, at least one of a channel and a symbol may be a signal (or signaling). Also, a signal may be a message. Also, a component carrier (CC) may also be referred to as a carrier frequency, a cell, a frequency carrier, or the like.

The terms "system" and "network" as used in the present disclosure may be used interchangeably.

Also, information, a parameter, or the like described in the present disclosure may be represented by using an absolute value, may be represented by using a relative value from a predetermined value, or may be represented by using corresponding other information. For example, a radio resource may be one indicated by an index.

A name used for a parameter described above is not a limited name in any respect. Further, a mathematical expression using such parameters may differ from that explicitly disclosed in the present disclosure. Since various channels (e.g., PUCCH, PDCCH, etc.) and information elements can be identified by all suitable names, the various names assigned to these various channels and information elements are not limited names in any respect.

In the present disclosure, terms such as "base station (BS)", "radio base station", "base station", "fixed station", "NodeB", "eNodeB (eNB)", "gNodeB (gNB)", "access point", "transmission point", "reception point", "transmission/reception point", "cell", "sector", "cell", "cell group", "carrier", and "component carrier" may be used interchangeably. A base station may be referred to as another term such as a macro cell, a small cell, a femtocell, a pico cell, or the like.

A base station may accommodate one or more (e.g., three) cells. When a base station accommodates multiple cells, the entire coverage area of the base station may be divided into multiple smaller areas, and each of the smaller areas may also provide communication services by a base station subsystem (e.g., an indoor small base station (RRH: Remote Radio Head)). The term "cell" or "sector" indicates a part or the entirety of the coverage area of at least one of the base stations and base station subsystems providing communications services in this coverage.

In the present disclosure, terms such as "mobile station (MS)", "user terminal", "terminal (or UE: User Equipment) ", and "terminal" may be used interchangeably.

A mobile station may be referred to by an ordinary skilled person in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or any other suitable term.

At least one of the base station and the mobile station may be referred to as a transmission apparatus, a reception apparatus, a communication apparatus, or the like. Note that at least one of the base station and the mobile station may be a device mounted on a mobile body, the mobile body itself, or the like. The mobile body may be a means of transportation (e.g., an automobile, an airplane, etc.), an unmanned mobile body (e.g., a drone, an autonomous vehicle, etc.), or a robot (a manned or unmanned type). Note that at least one of the base station and the mobile station includes an apparatus that does not necessarily move during a communication operation. For example, at least one of the base station and the mobile station may be an IoT (Internet of Things) device such as a sensor.

In addition, the base station in the present disclosure may be read as a user terminal. For example, the aspects and embodiments of the present disclosure may be applied to a configuration in which communication between a base station and a user terminal is replaced by communication between multiple terminals 20 (may be referred to as, for example, D2D (Device-to-Device), V2X (Vehicle-to-Everything)). In this case, a configuration may be adopted in which the functions included in the above base station 10 are included in the terminal 20. In addition, the words "uplink" and "downlink" may be read as a wording corresponding to communication between terminals (for example, "side"). For example, an uplink channel, a downlink channel, or the like may be read as a side channel.

Similarly, a user terminal in the present disclosure may be read as a base station. In this case, a configuration may be adopted in which the functions included in the user terminal described above are included in the base station.

The terms "determination (or determining)" and "decision (or determining)" used in the present disclosure may encompass a wide variety of operations. For example, "determination" and "decision" may include "determination" and "decision" made with judging, calculating, computing, processing, deriving, investigating, searching (looking up, search, inquiry) (e.g., search in a table, a database, or another data structure), or ascertaining. Also, "determination" and "decision" may include "determination" and "decision" made with, for example, receiving (e.g., receiving information), transmitting (e.g., transmitting information), input, output, or accessing (e.g., accessing data in a memory). Also, "determination" and "decision" may include "determination" and "decision" made with resolving, selecting, choosing, establishing, or comparing. In other words, "determination" and "decision" may include "determination" and "decision" made with a certain action. Also, "determination" and "decision" may be read as "assuming", "expecting", "considering", or the like.

The terms "connected", "coupled", or every variation of these means any direct or indirect connection or coupling between two or more elements, and may encompass a presence of one or more intermediate elements between two elements "connected" or "coupled" to each other. The coupling or connection between elements may be physical, logical, or a combination of these. For example, "connection" may be read as "access". When used in the present disclosure, such two elements may be considered to be "connected" or "coupled" each other by using at least one of one or more wires, cables, and printed electrical connections, or by using, as several non-restrictive and non-comprehensive examples, electromagnetic energy having a wavelength of a radio frequency domain, a microwave domain, light (both visible and invisible), and the like.

A reference signal may be abbreviated as an RS (Reference Signal) and may be referred to as a pilot depending on the standard to be applied.

A description using "based on" in the present disclosure does not mean "based only on" unless otherwise specified. In other words, "based on" means both "based only on" and "based at least on".

Any reference to elements specified with the words "first", "second", and so on used in the present disclosure does not limit the amount or the sequence of these elements in general. These words may be used in the present disclosure as a convenient way for distinguishing two or more elements among each other. Therefore, a reference to first and second elements does not mean that only the two elements are assumed, or that the first element should be considered to precede the second element in some way.

A "means" in the configuration of each of the devices described above may be replaced by "unit", "circuit", "device", and the like.

In the present disclosure, when the terms "include", "including", and variations of these are used, it is intended that these terms are as comprehensive as the term "comprising". Further, it is intended that the term "or" used in the present disclosure is not an exclusive OR.

A radio frame may be constituted with one or more frames in the time domain. In the time domain, each of the one or more frames may be referred to as a subframe. The subframe may be further constituted with one or more slots in the time domain. The subframe may have a fixed time length (e.g., 1 ms) that does not depend on the numerology.

The numerology may include a communication parameter that is applied to at least one of transmission and reception of a signal or a channel. The numerology may present, for example, at least one of subcarrier spacing (SCS), bandwidth, symbol length, cyclic prefix length, transmission time interval (TTI), number of symbols per TTI, radio frame configuration, specific filtering performed by a transceiver in the frequency domain, specific windowing performed by a transceiver in the time domain, and the like.

A slot may be constituted with, in the time domain, one or more symbols (OFDM (Orthogonal Frequency Division Multiplexing) symbols, SC-FDMA (Single Carrier Frequency Division Multiplexing) symbols) symbols, or the like). A slot may be a unit of time based on the numerology.

A slot may include multiple mini slots. Each mini slot may be constituted with one or more symbols in the time domain. A mini slot may also be referred to as a subslot. A mini slot may be constituted with a fewer number of symbols than a slot. PDSCH (or PUSCH) transmitted with a unit of time greater than a mini slot may also be referred to as PDSCH (or PUSCH) mapping type A. PDSCH (or PUSCH) transmitted by using mini slots may also be referred to as PDSCH (or PUSCH) mapping type B.

Any one of a radio frame, a subframe, a slot, a mini slot, and a symbol represents a unit of time when transmitting a signal. Different names may be used for a radio frame, a subframe, a slot, a mini slot, and a symbol, respectively.

For example, one subframe may be referred to as a transmission time interval (TTI); multiple consecutive subframes may be referred to as a TTI; and one slot or one mini slot may be referred to as a TTI. In other words, at least one of the subframe and the TTI may be a subframe (1 ms) in the existing LTE, may be a period shorter than 1 ms (e.g., 1 to 13 symbols), and may be a period longer than 1 ms. Note that the unit representing TTI may also be referred to as slot, mini slot, or the like.

Here, the TTI means, for example, a minimum unit of time of scheduling in radio communication. For example, in an LTE system, a base station performs scheduling by units of TTIs for each terminal 20 to allocate radio resources (such as frequency bandwidth, transmission power, etc., that can be used by each terminal 20). However, the definition of a TTI is not limited as such.

TTI may be a unit of time to transmit channel-coded data packets (transport blocks), code blocks, code words, and the like, or may be a unit of processing such as scheduling, link adaptation, and the like. Note that when a TTI is given, a time interval (e.g., the number of symbols) to which transport blocks, code blocks, code words, or the like are actually mapped may be shorter than the TTI.

In the case where one slot or one mini slot is referred to as a TTI, one or more TTIs (i.e., one or more slots or one or more mini slots) may be a minimum unit of time of scheduling. Also, the number of slots (the number of mini slots) constituting the minimum unit of time of scheduling may be controlled.

A TTI having a time length of 1 ms may be referred to as an ordinary TTI (a TTI in LTE Rel. 8-12), a normal TTI, a long TTI, an ordinary subframe, a normal subframe, a long subframe, a slot, or the like. A TTI shorter than an ordinary TTI may be referred to as a shortened TTI, a short TTI, a partial TTI (or fractional TTI), a shortened subframe, a short subframe, a mini slot, a subslot, a slot, or the like.

Note that a long TTI (e.g., an ordinary TTI, a subframe, etc.) may be read as a TTI having a time length exceeding 1 ms, and a short TTI (e.g., a shortened TTI, etc.) may be read as a TTI having a TTI length shorter than that of a long TTI and longer than or equal to 1 ms.

A resource block (RB) is a unit of resource allocation in the time domain and in the frequency domain, and may include one or more consecutive subcarriers in the frequency domain. The number of subcarriers included in an RB may be the same regardless of the numerology, which may be, for example, 12. The number of subcarriers included in an RB may be determined based on the numerology.

Also, an RB in the time domain may include one or more symbols, and may have a length of one mini slot, one subframe, or one TTI. One TTI, one subframe, and the like may be constituted with one or more resource blocks, respectively.

Note that one or multiple RBs may be referred to as physical resource blocks (PRB), a subcarrier group (SCG), a resource element group (REG), a PRB pair, an RB pair, or the like.

Also, a resource block may be constituted with one or more resource elements (RE). For example, one RE may be a radio resource area of one subcarrier and one symbol.

A bandwidth part (BWP, which may be referred to as a partial bandwidth, etc.) may represent a subset of consecutive common RB (common resource blocks) in terms of certain numerology in a certain carrier. Here, a common RB may be identified by an RB index with reference to a common reference point in the carrier. PRB may be defined in a BWP to be numbered in the BWP.

BWP may include a BWP for UL (UL BWP) and a BWP for DL (DL BWP). One or more BWPs may be configured in one carrier for the terminal 20.

At least one of the configured BWPs may be active, and the terminal 20 does not need to assume performing transmission or reception of a predetermined signal/channel outside the active BWP. Note that "cell", "carrier", or the like in the present disclosure may be read as "BWP".

The structures of radio frames, subframes, slots, mini slots, symbols, and the like described above are merely examples. For example, configurations of the number of subframes included in a radio frame; the number of slots per subframe or radio frame; the number of mini slots included in a slot; the number of symbols and RBs included in a slot or a mini slot; the number of subcarriers included in an RB; the number of symbols included in a TTI; the symbol length; the length of cyclic prefix (CP); and the like, can be changed in various ways.

In the present disclosure, in the case where an article, for example, "a", "an", or "the" in English, is added by translation, the present disclosure may include a plural form the noun following these articles.

In the present disclosure, the term "A and B are different" may mean "A and B are different from each other". The term may mean "A and B are different from C, respectively". Terms such as "separate" and "coupled" may also be interpreted in the same way as "different."

The aspects and embodiments described in the present disclosure may be used individually, may be combined to be used, or may be switched during execution to be used. Indication of predetermined information (e.g., indication of "being X") is not limited to an explicit indication, and may be done implicitly (e.g., by not indicating the predetermined information).

Note that SCI in this present disclosure is an example of control information. A NACK response is an example of a negative response.

As above, the present disclosure has been described in detail; note that it is apparent to those skilled in the art that the disclosure is not limited to the embodiments described in the present disclosure. The present disclosure may be implemented as a modified and changed aspect without deviating from the purpose and scope of the present disclosure defined by the description of the claims. Accordingly, the description of the present disclosure is intended for illustrative purposes and does not have any restrictive meaning with respect to the present disclosure.

DESCRIPTION OF REFERENCE SIGNS

10 base station
110 transmission unit
120 reception unit
130 configuration unit
140 control unit
20 terminal
210 transmission unit
220 reception unit
230 configuration unit
240 control unit
1001 processor
1002 storage device
1003 auxiliary storage device
1004 communication device
1005 input device
1006 output device

The invention claimed is:

1. A terminal comprising:

a receiver configured to receive, from another terminal, first control information in communication between terminals; and a processor configured to calculate a size of a transport block to be received from the other terminal, based on a modulation and coding scheme (MCS) index that is included in the first control information, the MCS index being other than an MCS index whose corresponding target code rate in a table is reserved, the table being a table in which MCS indexes, modulation orders, and target code rates are associated with each other, wherein the receiver does not receive the first control information including an MCS index whose corresponding target code rate in the table is reserved, which is transmitted from the other terminal, the receiver receives second control information for a physical downlink shared channel (PDSCH) from a base station, the processor calculates a transport block size (TBS) of the PDSCH to be received from the base station, based on an MCS index included in the second control information that is downlink control information (DCI) being the most recent DCI for designating an initial transmission of the transport block of the PDSCH, the corresponding target code rate of the MCS index in the table being reserved, and when 256 quadrature amplitude modulation (QAM) is configured, the processor determines to use the table in which the modulation order can be configured to 8 and in which the target code rate is configured to be reserved.

2. The terminal as claimed in claim 1, wherein a value of the MCS index whose corresponding target code rate in the table includes 28, 29, 30, and 31 in a case of using the table in which the modulation order can be configured to 8, and the value includes 29, 30, and 31 in a case of using the table in which the modulation order cannot be configured to 8.

3. A communication method of a terminal, the communication method comprising:

receiving, from another terminal, first control information in communication between terminals; and calculating a size of a transport block to be received from the other terminal, based on a modulation and coding scheme (MCS) index that is included in the first control information, the MCS index being other than an MCS index whose corresponding target code rate in a table is reserved, the table being a table in which MCS indexes, modulation orders, and target code rates are associated with each other, wherein the terminal does not receive the first control information including an MCS index whose corresponding target code rate in the table is reserved, which is transmitted from the other terminal, the terminal receives second control information for a physical downlink shared channel (PDSCH) from a base station, the terminal calculates a transport block size (TBS) of the PDSCH to be received from the base station, based on an MCS index included in the second control information that is downlink control information (DCI) being the most recent DCI for designating an initial transmission of the transport block of the PDSCH, the corresponding target code rate of the MCS index in the table being reserved, and when 256 quadrature amplitude modulation (QAM) is configured, the terminal determines to use the table in which the modulation order can be configured to 8 and in which the target code rate is configured to be reserved.

* * * * *